US012116723B2

(12) United States Patent
Davirro et al.

(10) Patent No.: US 12,116,723 B2
(45) Date of Patent: Oct. 15, 2024

(54) SYSTEM FOR CREATING FOLDS IN TEXTILES

(71) Applicant: Dye-No-Myte, Ltd., Hilliard, OH (US)

(72) Inventors: Dominic Davirro, Upper Arlington, OH (US); Brian Patrick O'Riordan, Ashville, OH (US); Ian Thomas Molitors, Hilliard, OH (US); Nathan Matthew Brown, Columbus, OH (US); Luke Christopher Stonis, Columbus, OH (US); Terry Richard Paul, Reynoldsburg, OH (US); Shannon Douglas Staats, Ostrander, OH (US)

(73) Assignee: Dye-No-Myte, Ltd., Hilliard, OH (US)

( * ) Notice: Subject to any disclaimer, the term of this patent is extended or adjusted under 35 U.S.C. 154(b) by 78 days.

(21) Appl. No.: 17/963,683

(22) Filed: Oct. 11, 2022

(65) Prior Publication Data

US 2023/0114155 A1    Apr. 13, 2023

Related U.S. Application Data

(60) Provisional application No. 63/254,744, filed on Oct. 12, 2021.

(51) Int. Cl.
  *D06F 89/02*   (2006.01)
  *D06F 89/00*   (2006.01)
  *B25J 15/00*   (2006.01)

(52) U.S. Cl.
  CPC ............ *D06F 89/023* (2013.01); *D06F 89/00* (2013.01); *B25J 15/0028* (2013.01)

(58) Field of Classification Search
  CPC ......... D06F 89/00; D06F 89/02; D06F 89/023
  See application file for complete search history.

(56) References Cited

U.S. PATENT DOCUMENTS

| | | | |
|---|---|---|---|
| 9,936,709 B2 * | 4/2018 | Bernhardt | A21C 3/08 |
| 2003/0052141 A1 * | 3/2003 | Rauch | D06F 89/00 223/37 |
| 2018/0163342 A1 * | 6/2018 | Kitagawa | D06F 89/00 |

* cited by examiner

*Primary Examiner* — Shaun R Hurley
(74) *Attorney, Agent, or Firm* — Standley Law Group LLP; Beverly A. Marsh; Kenny W. Pung

(57) ABSTRACT

A system for creating folds in textiles. The system includes a tooling plate, a loading assembly, a fold mechanism, a wrangler mechanism, and a door mechanism. The loading assembly enable a user to load a textile into the system. The fold mechanism creates folds in the textile. The wrangler mechanism compacts a textile after folds have been created in it to retain and tighten the folds. The door mechanism opens and closes an opening in the tooling plate through which textiles can be transferred away from the wrangler mechanism. Preferably, the system may also include a robot arm equipped to transfer textiles about the system and a tying machine for applying bindings to textiles.

20 Claims, 23 Drawing Sheets

SYSTEM FOR CREATING FOLDS IN TEXTILES

CROSS-REFERENCE TO RELATED APPLICATIONS

This application is a nonprovisional patent application that makes a priority claim to U.S. Provisional Application No. 63/254,744, the content of which is hereby incorporated by reference as if fully recited herein.

FIELD

The application relates to systems, methods, and apparatus for creating folds in textiles and, more particularly, to systems, methods, and apparatus for creating spiral folds in textiles for use in tie-dye.

BACKGROUND

Resist dyeing is a method of dyeing textiles (i.e., pieces of cloth including articles of clothing) with patterns. This method entails creating "resists" either in or on a piece of textile that prevents dye from being applied to the entirety of the textile. By applying the dye and subsequently removing the resists, patterns may be created in the textile in the areas where the resists once were.

There are several types of resists that can be utilized in resist dyeing. Perhaps the oldest type of resist is wax or paste that may be applied to a piece of textile in a desired shape or pattern, and then subsequently scrapped off or washed away after dyeing. Stencils are another type of resist that can be utilized in much the same way.

Another type of resist, one that is more pertinent to the present disclosure, is mechanical resists (i.e., folds) that are made by deliberately folding, twisting, pleating, crumpling, or otherwise physically manipulating a piece of textile. Mechanical resists are not applied to a piece of textile so much as they are created in one. The folds created in this way prevent dye from seeping or penetrating entirely through the textile, resulting in patterns defined by the undyed areas of the textile. The textile may also be tied, stitched, or clamped to maintain the folds throughout the dyeing process.

The process of creating mechanical resists, tying a textile to maintain the mechanical resists, and then dyeing is colloquially known today as "tie-dye." Most commonly, tie-dye is performed by hand and in a recreational capacity.

Those skilled in the art will appreciate that creating tie-dye by hand is not ideal for modern commercial enterprises. Creating tie-dye by hand is time consuming and, more often than not, results in inconsistent patterns owing to the lack of uniformity in which the mechanical resists are made. If mechanical resists are not made in the right manner the resulting dye pattern may also be blurred and aesthetically unpleasing to the end consumer. Therefore, what is desired is a method, system, and/or apparatus that can create mechanical resists in textiles quickly, sufficiently, and in a standardized fashion. Accordingly, those skilled in the art continue with research and development efforts in the field of creating mechanical resists in textiles.

SUMMARY OF THE INVENTION

Disclosed are systems for creating folds in textiles.

In one embodiment, the system includes a first planar surface and a second planar surface spaced apart from the first planar surface. A loading space is defined in-between the first planar surface and the second planar surface where textiles can be inserted. An opening is defined in the first planar surface. The system also includes a fold mechanism that includes a contact, a means for inserting the contact through the opening to engage a textile against the second planar surface, and a motor configured to rotate the contact, thereby twisting the textile. The system further includes a wrangler mechanism that includes a plurality of contacts located within the loading space that are arranged about the opening and a means for moving each contact between at least a first position and a second position. The first positions of each contact is closer to the opening than the second positions of each contact. The contacts, when in the first position, are configured to compact a textile that has been inserted into the loading space.

In another embodiment, the system includes a vertical tooling plate that defines a first major side, a second major side opposite the first major side, and an opening through the tooling plate that extends between the first major side and the second major side. The system also includes a planar surface spaced apart from the first major side of the tooling plate. The system also includes a loading space where textiles can be inserted into the system, the loading space being defined in-between the planar surface and the first major side of the tooling plate. The system also includes a door mechanism that includes a door sized and shaped to fit within the opening in the tooling plate, a means for inserting the door into and removing the door from the opening in the tooling plate, and an opening defined in and extending through the door. The system also includes a fold mechanism that includes a contact, a means for inserting the contact through the opening in the door to engage a textile against the planar surface, and a motor configured to rotate the contact, thereby twisting the textile. The system also includes a wrangler mechanism that includes a plurality of contacts located within the loading space and arranged about the opening in the door and a means for moving each contact between at least a first position and a second position. The first positions of each contact are closer to the opening in the door than the second positions of each contact. The contacts, when in the first position, are configured to compact a textile that has been inserted into the loading space.

In yet another embodiment, the system includes a tooling plate that defines a first major side, a second major side opposite the first major side, and an opening through the tooling plate that extends between the first major side and the second major side. The system also includes a planar surface spaced apart from the first major side of the tooling plate. The system also includes a loading space where textiles can be inserted into the system, the loading space being defined in-between the planar surface and the first major side of the tooling plate. The system also includes a door mechanism proximate the second major side of the tooling plate that includes a door sized and shaped to fit within the opening in the tooling plate, a means for inserting the door into and removing the door from the central opening, and an opening defined in and extending through the door. The system also includes a fold mechanism proximate the second major side of the tooling plate that includes a contact, a means for inserting the contact through the opening in the door to engage a textile against the planar surface, and a motor configured to rotate the contact, thereby twisting the textile. The system also includes a wrangler mechanism proximate the first major side of the tooling plate that includes a plurality of contacts located within the loading space and arranged about the opening in the door and a means for moving each contact between at least a first position and a second position. The first positions of each contact are closer to the opening in the door than the second positions of each contact. The contacts, when in the first position, are configured to compact a textile that has been inserted into the loading space.

Other examples of the disclosed system will become apparent from the following detailed description, the accompanying drawings and the appended claims.

DETAILED DESCRIPTION

Figure 1:
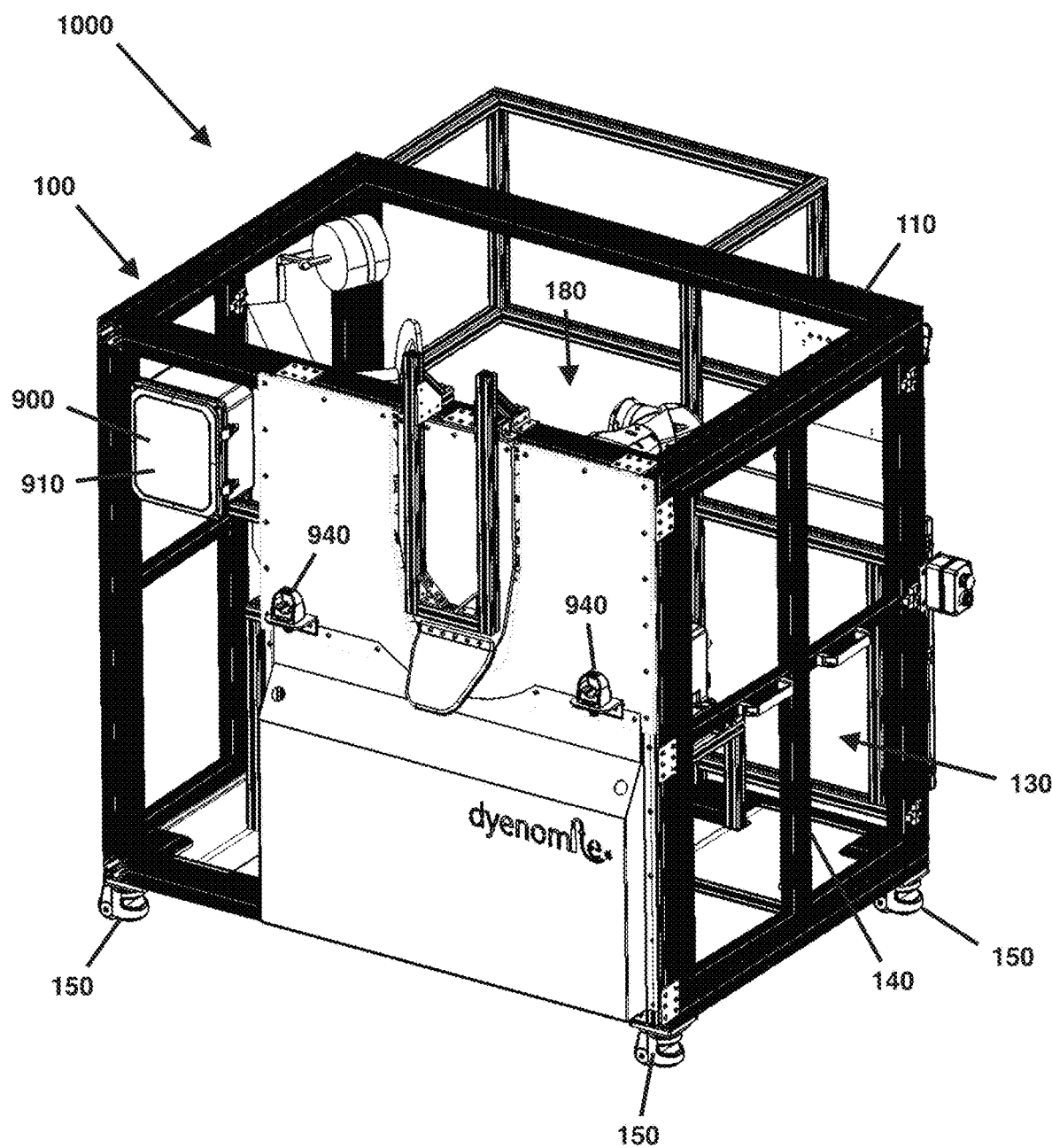
FIG. 1 is a front perspective view of an exemplary embodiment of the system for creating folds in textiles.
Figure 2:
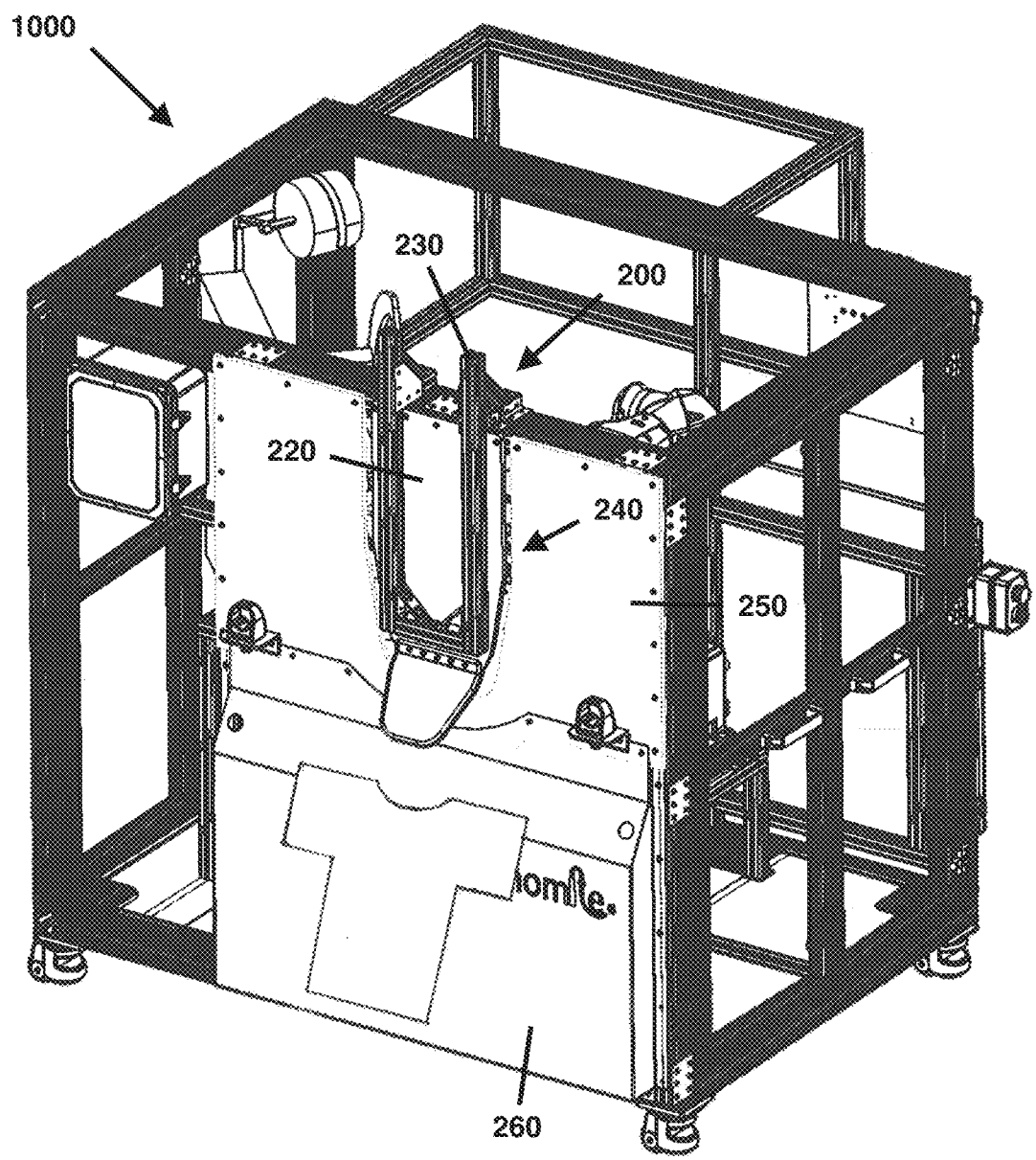
FIG. 2 is a front perspective view of the system of FIG. 1 with a T-shirt.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

The present disclosure relates to a system for creating folds (i.e., mechanical resists) in textiles. The system is configured to enable the loading of textiles, the creation of folds in the textiles, and then the compaction the textiles to retain the folds. It is contemplated that the mechanized nature of the system enables faster production of folded textiles and a greater uniformity in those folds. Preferred embodiments of the system will also include components for tying/binding textiles and for maneuvering textiles about the system.

It is contemplated that the system may be suitable for creating folds in a wide variety of textile products (e.g., articles of clothing, blankets, etc.) and in a wide variety of material compositions (e.g., cotton, polyester, etc.). In particular, it is contemplated that the system may be suitable for creating folds in cotton T-shirts.

Referring to FIGS. 1-5, the present disclosure provides an exemplary embodiment of the system 1000. While this embodiment is considered exemplary, it is not meant to be limiting. Variations can be made to this design without departing from the scope of the present disclosure.

The system 1000 of FIG. 1 includes a cage 100 that encloses various components of the system 1000. Ideally most, if not all, of the functions carried out by the system 1000 should occur within the cage 100 to minimize the risk of unintentional worker interference. The cage 100 includes frame 110, a plurality of walls attached to the frame 110 (not shown), and an interior space 130 defined therebetween. Doors 140 can also be provided to permit entry into the interior space 130. Feet 150 can also be provided to elevate the cage 100 (e.g., to make the system 1000 maneuverable by forklift).

Figure 6:
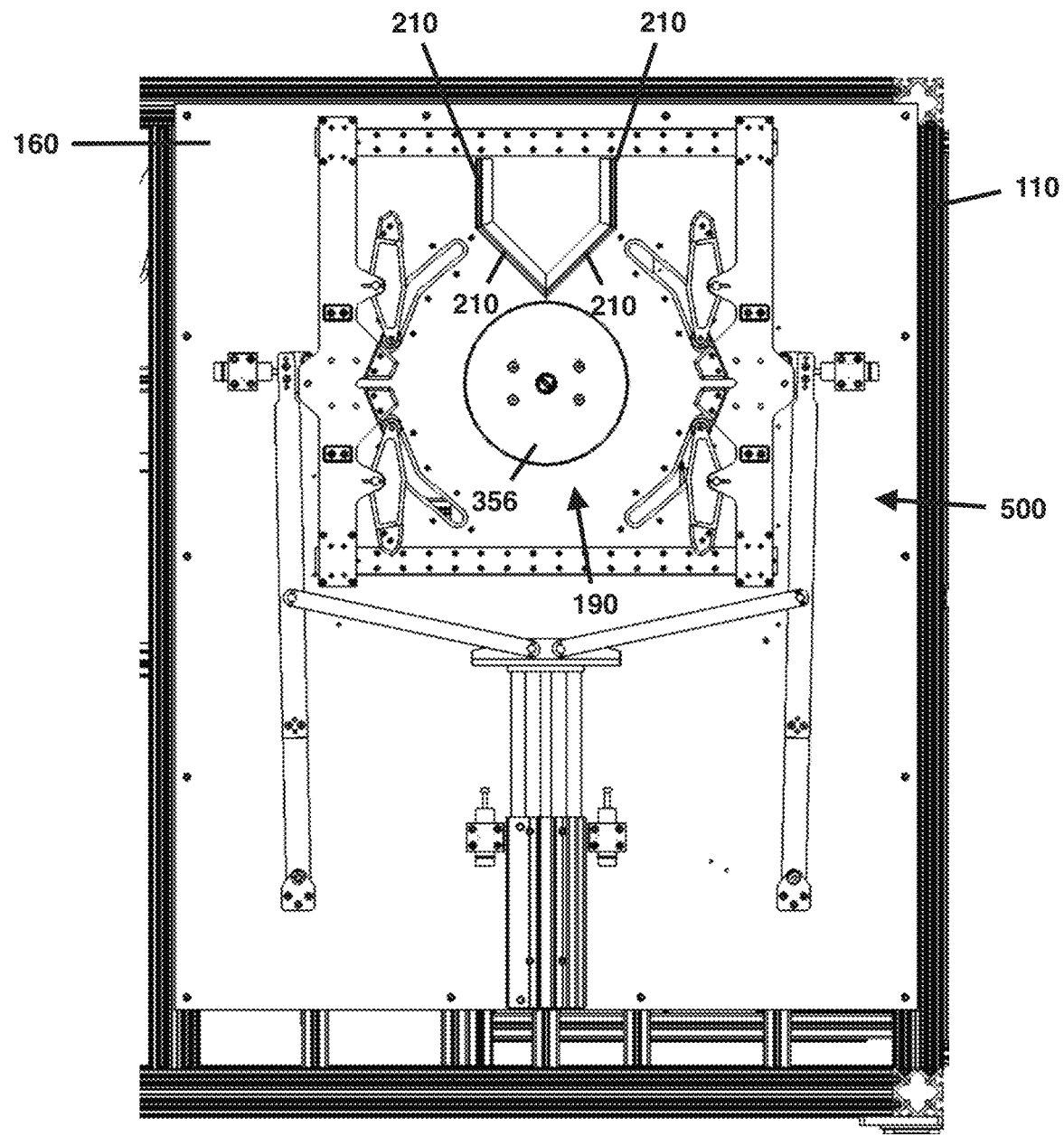
FIG. 6 is a front elevation view of the tooling plate and wrangler mechanism of the system of FIG. 1.
Figure 7:
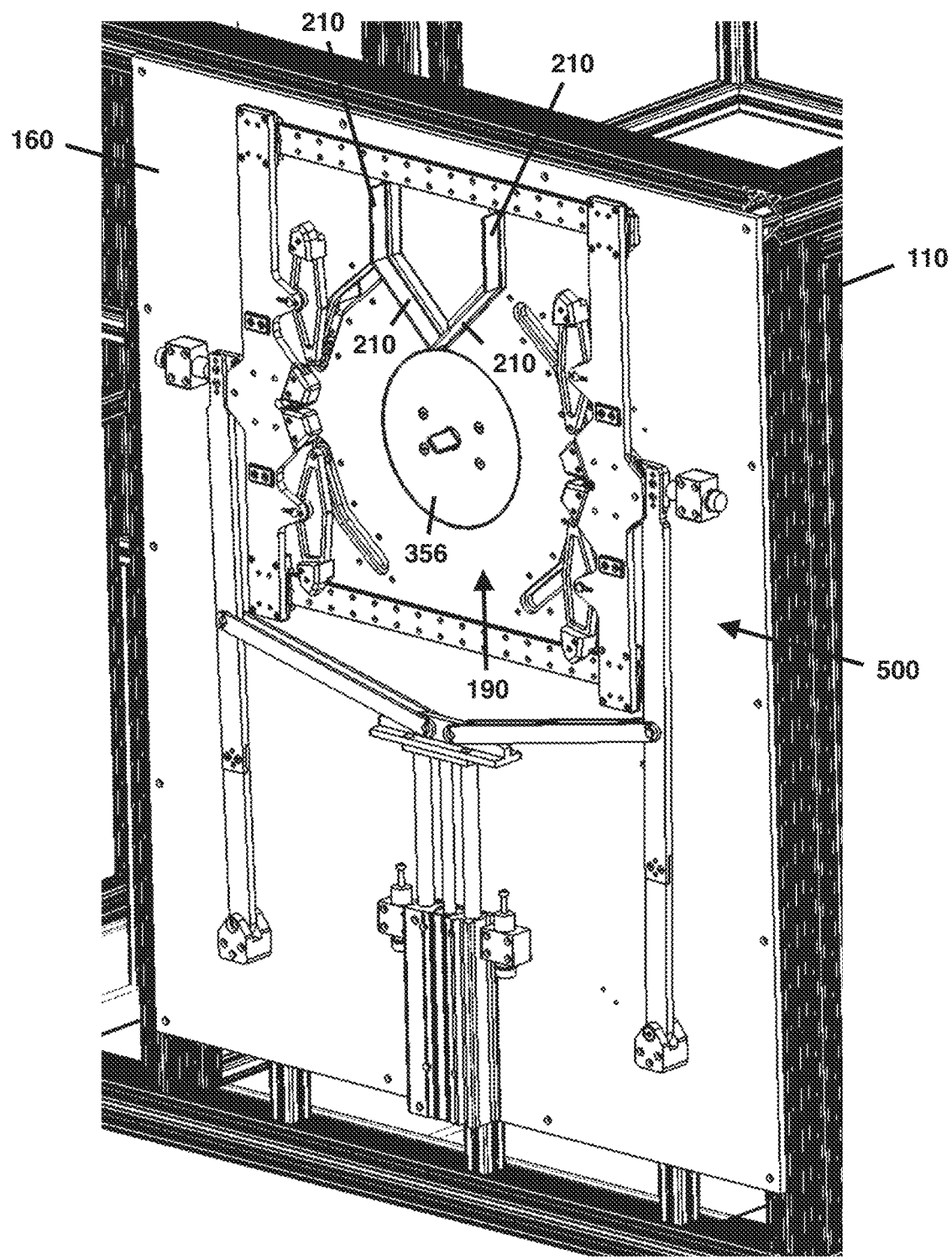
FIG. 7 is a front perspective views of the tooling plate and wrangler mechanism of FIG. 6.

Referring to FIGS. 6-7, the system 1000 of FIG. 1 includes a tooling plate 160 mounted vertically to the frame 110. The tooling plate 160 supports the attachments of various other components of the system 1000 (e.g., via holes for mechanical fasteners as shown in FIG. 10), such as loading assembly 200 (FIGS. 2 and 3), door mechanism 300 (FIGS. 11-16), and wrangler mechanism 500 (FIGS. 6-10). The tooling plate 160 defines a planar first major side 162 and a planar second major side 164 (FIG. 10). The tooling plate 160 also defines a central opening 166 that extends between both sides (i.e., through the body of the tooling plate 160). The central opening 166 is shown here as being circular in shape.

In reference to the various components described below, the term "outward-facing" means away from tooling plate 160 and the term "inward-facing" means towards tooling plate 160.

Figure 3:
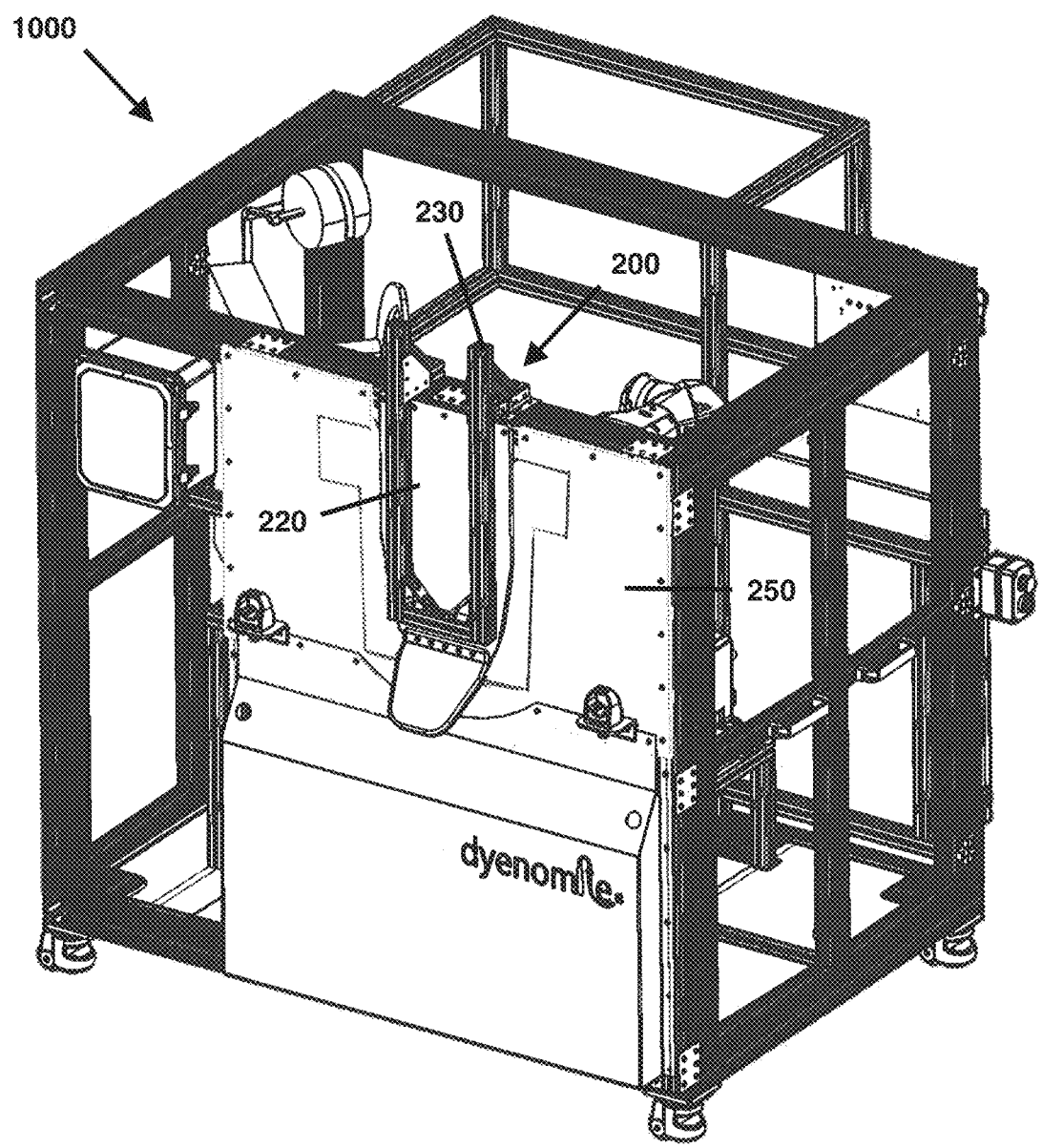
FIG. 3 is a front perspective view of the system of FIG. 1 after the T-shirt of FIG. 2 has been loaded.

Referring to FIGS. 1-3, 6 and 7, the system of FIG. 1 includes a loading assembly 200. The loading assembly 200 retains a textile that has been loaded into the system 1000 and ensures that it is in the correct orientation for subsequent processing. In the embodiment shown, the loading assembly 200 includes a plurality of brushes 210 (e.g., nylon brushes) mounted on first major side 162 of the tooling plate 160 and a center guard 220 spaced a distance apart from the first major side 162 of the tooling plate 160. Center guard 220 defines an inward-facing planar surface. A space 190 (referred to herein as the "loading space") is defined between the inward-facing planar surface of the center guard 220 and the first major side 162 of the tooling plate 160 (FIGS. 6 and 7). The bristle ends of the brushes 210 (best shown in FIG. 7) are oriented away from the tooling plate 160 and towards center guard 220. Center guard 220 is attached to the frame 110 and extends across the bristle ends, proximate (i.e., at or near) to them. A textile can be loaded into this loading assembly 200 by sliding it under center guard 220 (FIG. 2) and lifting it upwards in the loading space 190 until it is urged against (i.e., pinned to) the center guard 220 by the brushes 210 (FIG. 3). Gravity will straighten out the textile when it is loaded. And as shown, some of the textile may remain outside of the loading space. The degree of clearance (i.e., spacing) between the center guard 220 and the first major side 162 of the tooling plate 160 may vary depending on the type or of textile or the thickness of the textile loaded into the system 1000. Preferably, the clearance between the center guard 220 and the first major side 162 of the tooling plate 160 may be about 1 inch to about 1.5 inches. Reinforcing structure 230 may also be provided to prevent the center guard 220 from bending outwards (i.e., away from the tooling plate) during the loading process.

Either in addition to or as an alternative for brushes 210, it is contemplated that different types of textile retention features may be utilized without departing from the scope of the present disclosure. This can include, for example, pins, clamps, clips, and/or the like.

Referring to FIG. 1, the system of FIG. 1 includes peripheral guard 250. Peripheral guard 250 extends across the frame 110 to cover the entire first major side 162 of the tooling plate 160, thereby preventing workers from accidentally interfering with the system components (namely, wrangler mechanism 500). Peripheral guard 250 is also shaped to match (i.e., align with) the periphery of the center guard 220 such that a U-shaped slot 240 is defined between them. Additional cladding 260 may further be included to cover or protect components of the system 1000 as needed.

Referring to FIGS. 11-21, the system of FIG. 1 includes a door mechanism 300 mounted to second major side 164 of the tooling plate 160. Door mechanism 300 includes door 356 and is configured to maneuver door 356 into and out of the central opening 166 in the tooling plate 160. Preferably, door 356 (shown here as being circular) would match the size and shape of the central opening 166. Preferably, door 356 includes a planar door face 358 that is flush (i.e., coplanar) with the first major side of the tooling plate when door 358 is inserted into the central opening, such that door face 358 and the first major side 162 collectively define a single planar surface.

Figure 10:
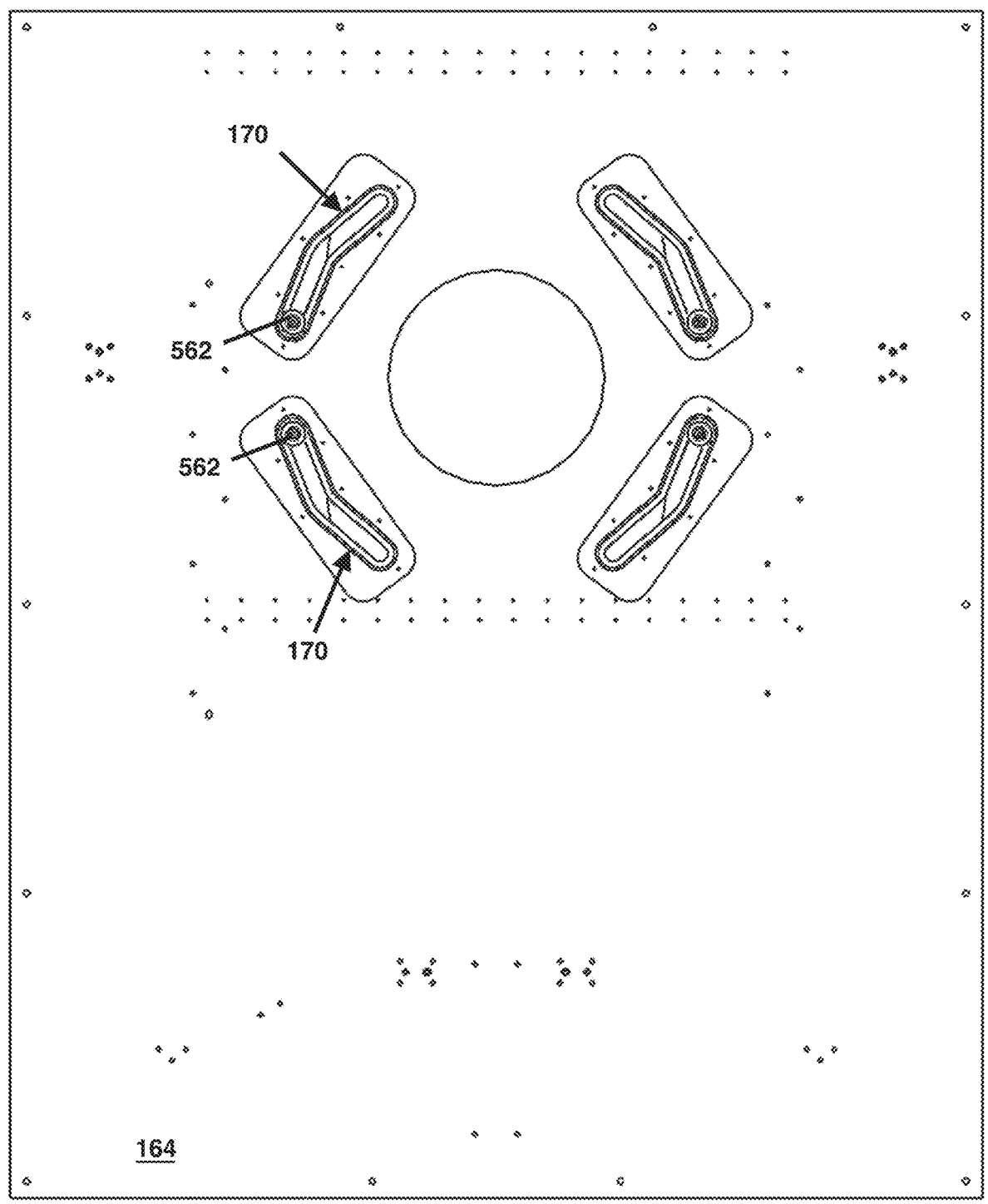
FIG. 10 is a rear elevation view of the tooling plate of FIG. 6.
Figure 11:
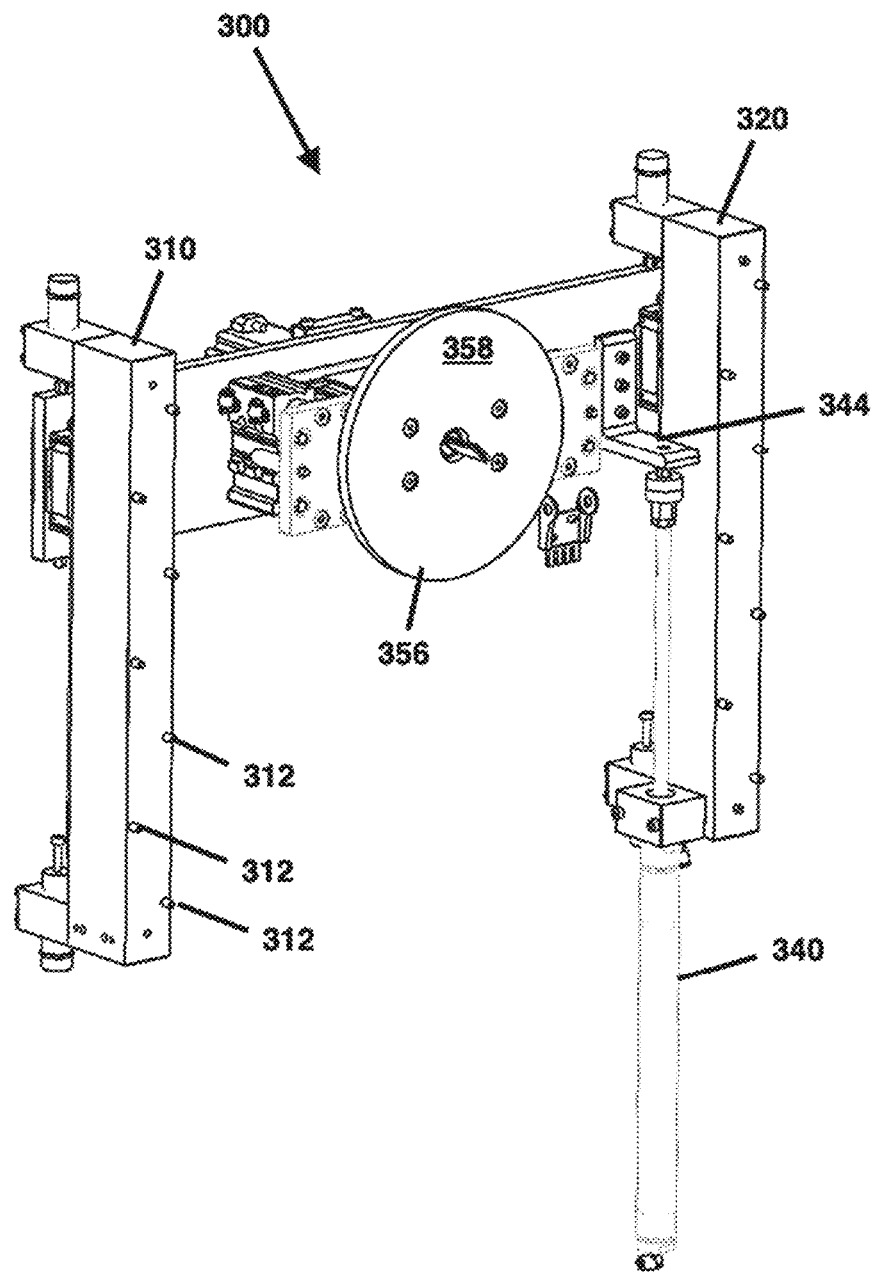
FIG. 11 is a front perspective view of the door mechanism and fold mechanism of the system of FIG. 1.
Figure 12:
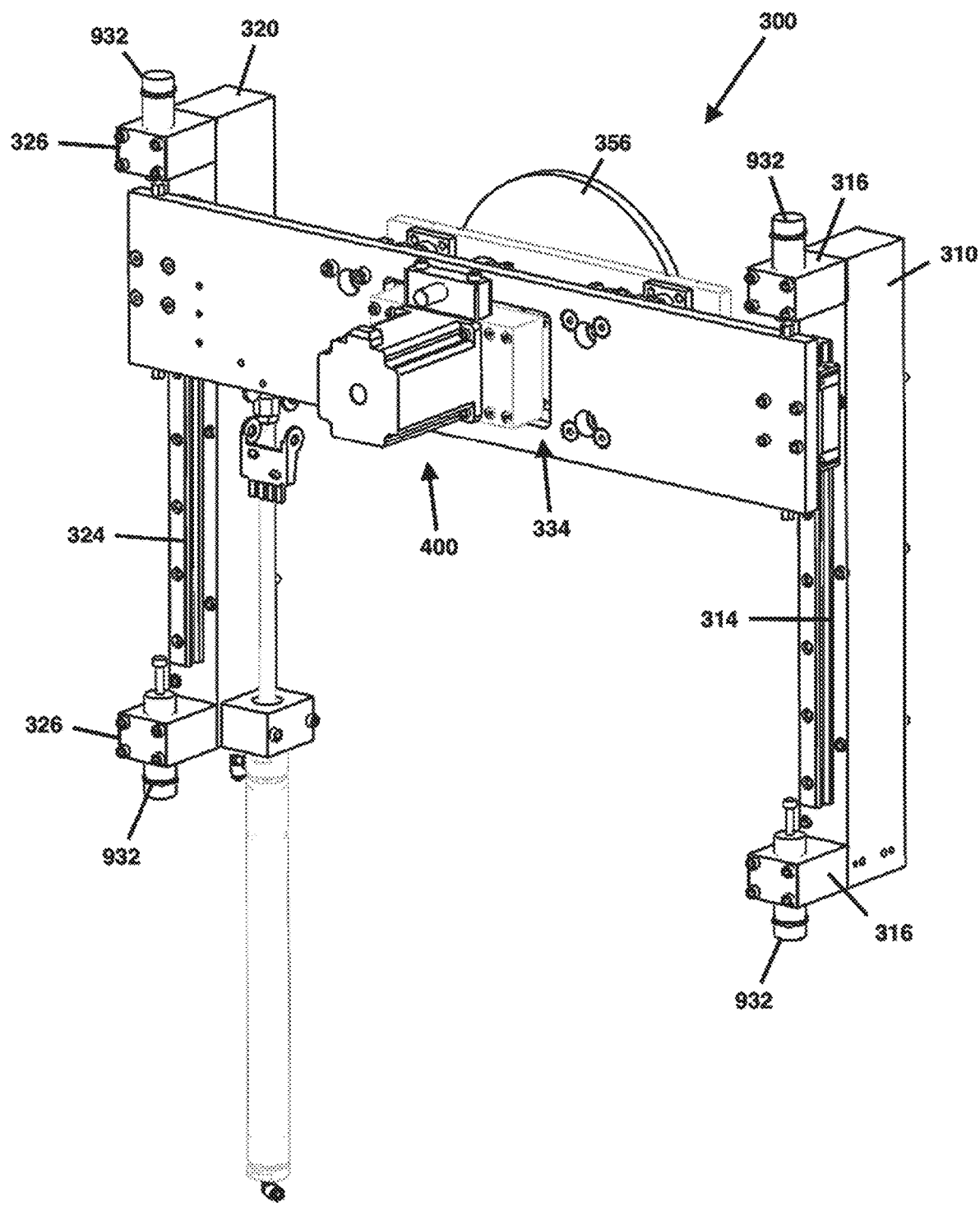
FIG. 12 is a rear perspective view of the door mechanism and fold mechanism of FIG. 11.

Referring to FIGS. 11 and 12 the door mechanism 300 includes a first vertical member 310 and a second vertical member 320. The first vertical member 310 includes a vertically oriented, elongated body that defines an outward-facing side and an inward-facing side. The inward-facing side features several prongs 312 that enable it to be attached/mounted to the tooling plate 160 (via holes 168 defined in the tooling plate 160; shown in FIG. 10). The outward-facing side includes a track 314 extending across a substantial length of the elongated body. Also included are end-pieces 316 disposed along the top and bottom ends of the first vertical member 310, along the outward-facing side. The second vertical member 320 is identical to the first vertical member 310.

Figure 13:
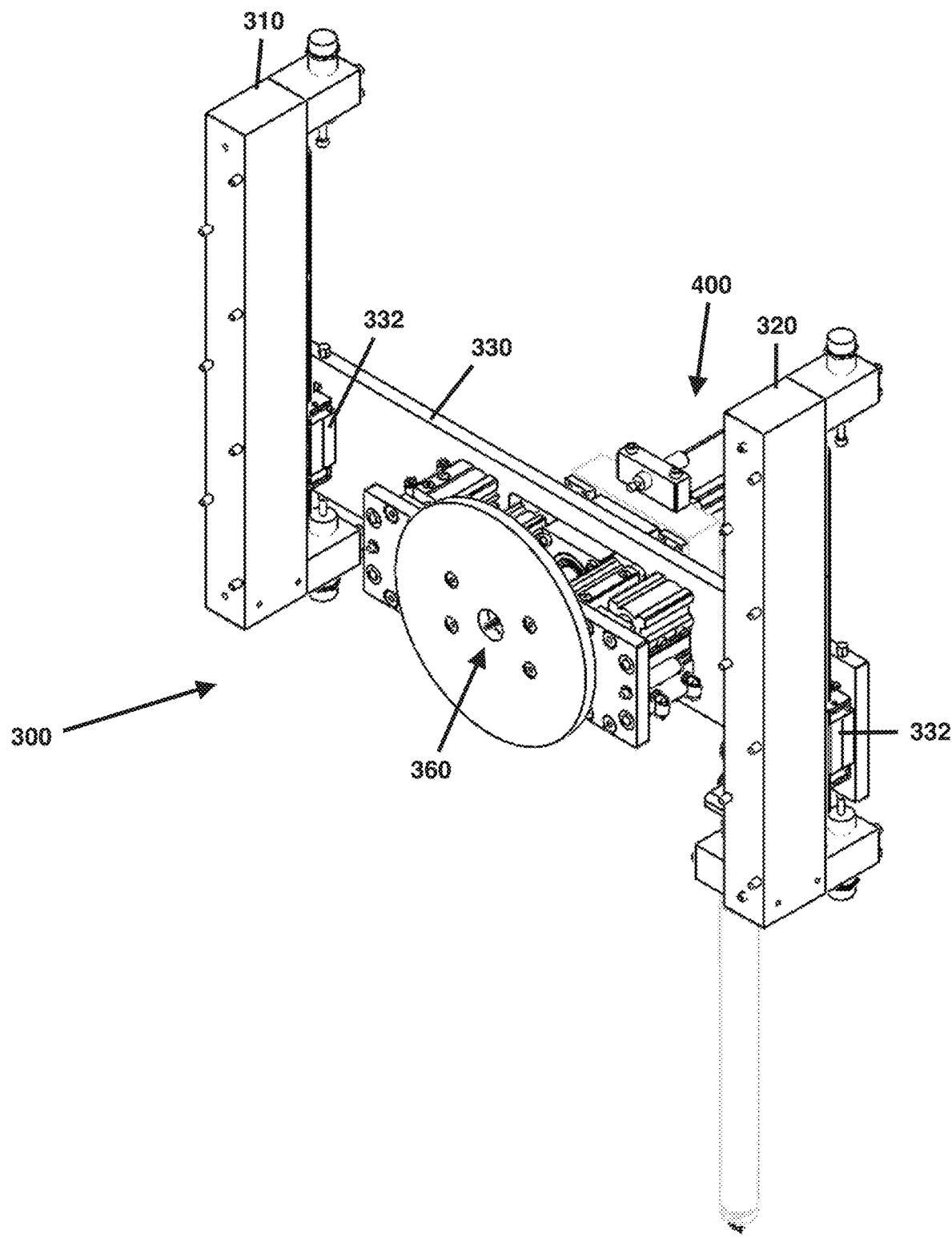
FIG. 13 is a front perspective view of the door mechanism and fold mechanism of FIG. 11, with the door mechanism lowered and the fold mechanism retracted.
Figure 14:
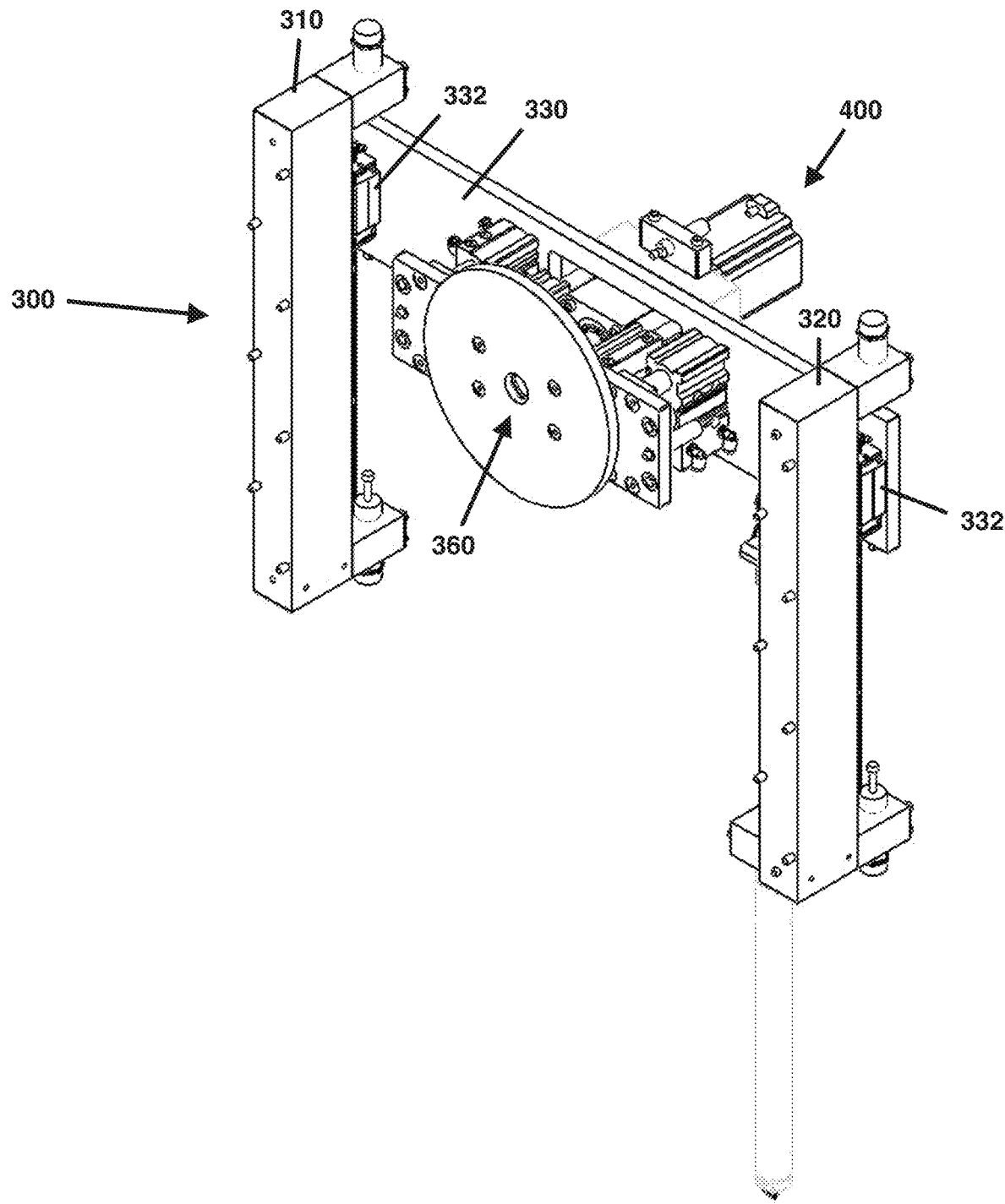
FIG. 14 is a front perspective view of the door mechanism and fold mechanism of FIG. 11, with the door mechanism raised and the fold mechanism retracted.

Referring to FIGS. 13 and 14, the door mechanism 300 also includes first crossmember 330. The first crossmember 330 is elongated horizontally and features roller brackets 332 attached to its inward-facing side along its longitudinal ends. The roller brackets 332 provide for attachment to, and movement along, the tracks 314, 324 on the first and second vertical members 310, 320. End pieces 316, 326 set boundaries for its travel path, ensuring that the first crossmember 330 stays on the tracks 314, 324. Ideally, the first and second vertical members 310, 320 would be attached to tooling plate 160 at a vertical height that would allow door 356 to align with the central opening 166.

Referring to FIG. 11, the door mechanism 300 also includes linear actuator 340. Linear actuator 340 is vertically oriented, attached at the top to first crossmember 330 (via bracket 344), and fixed at the bottom to a suitable structure (e.g., frame 110 or the ground). Linear actuator 340 is configured to raise and lower first crossmember 330 along tracks 314, 324.

Figure 16:
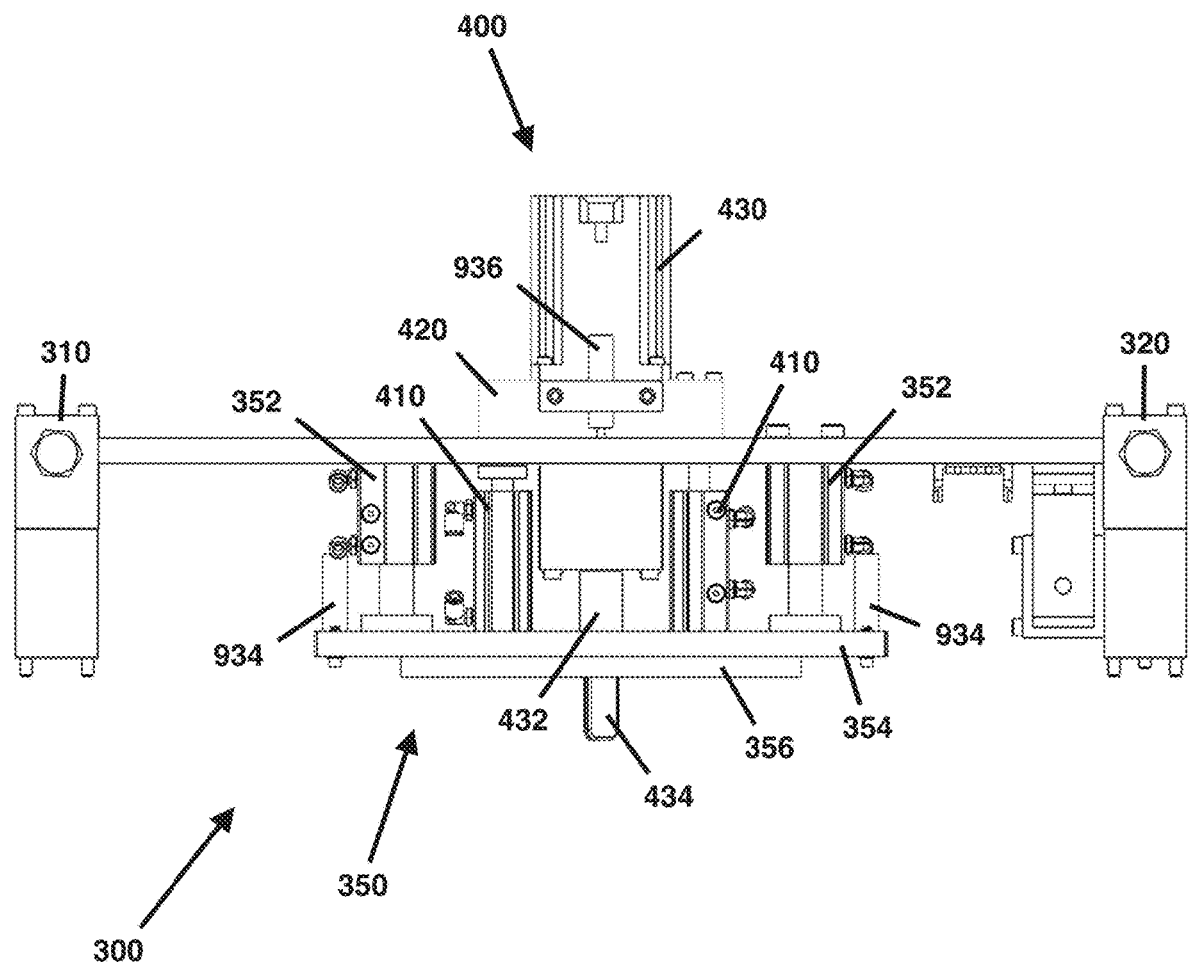
FIG. 16 is a top plan view of the door mechanism and fold mechanism of FIG. 11.

Referring to FIG. 16, mounted onto the first crossmember 330 is door subassembly 350, which is configured to move door 356 into and out of the central opening 166. Door subassembly 350 includes linear actuators 352, second crossmember 354, and door 356. Linear actuators 352 are mounted to the inward-facing side of the first crossmember 330 and oriented towards the tooling plate 160. The outward-facing side of the second crossmember 354 is attached to the linear actuators 352 and door 356 is mounted to its inward-facing side. Collectively, linear actuators 352 are configured to move second crossmember 354 towards the tooling plate 160 until door 356 is fully inserted into central opening 166 and/or the second crossmember 354 abuts against the second major side 164 of the tooling plate 160 (FIGS. 6 and 7). The linear actuators 352 are also configured to retract door 356 from the tooling plate 160 to open the central opening 166 back up again.

Also mounted to the first crossmember 330 is fold mechanism 400. Fold mechanism 400 includes linear actuators 410, mounting block 420, motor 430, shaft 432, and contact 434. Contact 434 is paddle-shaped and can either be attached to or formed as a part of shaft 432. It is contemplated that the shape of contact 434 can vary in other embodiments. Motor 430 is configured to rotate shaft 432, and thereby the contact 434. When applied to a textile that has been loaded into the loading assembly 200, the contact 434 may effectively simulate a twisting motion that twists the textile to create spiral folds in the fabric. The direction that contact 434 is rotated defines the direction of the spiral folds. Moreover, rotational speed and the number of forward rotations can be adjusted for different types and sizes of textile. The larger the textile, the more rotations will be required to create spiral folds in the entire textile. It is further contemplated that the contact can also be rotated in the reverse direction (at least to some extent) after creating spiral folds in order to release tension that builds in the center of the textile, thereby making it easier to remove the contact from the twisted textile.

Figure 15:
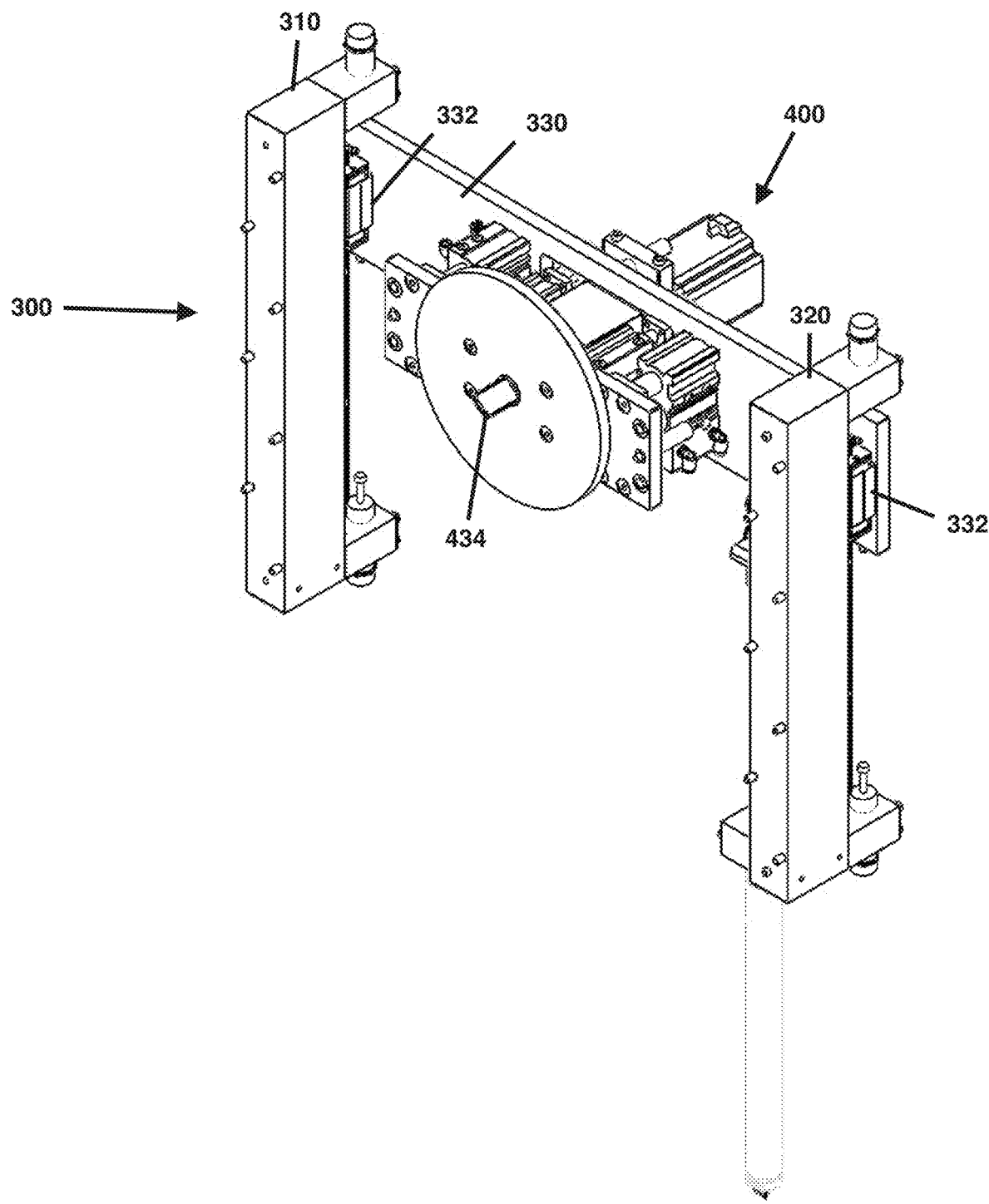
FIG. 15 is a front perspective view of the door mechanism and fold mechanism of FIG. 11, with the door mechanism raised and the fold mechanism extended.

Linear actuators 410 may be mounted to the outwards-facing side of the second crossmember 354 and, in turn, attached to mounting block 420. Opening 334 defined in the first crossmember 330 provides space for the mounting block 420 and/or linear actuators 410 to move through the first crossmember 330 (FIG. 12). Motor 430 may be attached to the outward-facing side of mounting block 420 and shaft 432 and contact 434 may extend through openings or bores defined in the mounting block 420, second crossmember 354, and door 356 (e.g., ref. no. 360; shown in FIG. 14). Collectively, linear actuators 410 may be configured to move the mounting block 420, motor 430, and shaft 432 in a linear path both towards and away from the tooling plate 160, thereby causing contact 434 to extend through and retract back into the opening 360 defined in door 356 (FIGS. 14 and 15). This functionality is useful because textiles can sometimes get caught (i.e., snagged) on the contact 434 during the loading process if the door 356 is closed and the contact 434 is extended. The ability to retract the contact 434 ensures this won't happen.

Of course, it is contemplated that other means of creating folds may also be utilized, including folding mechanisms that create different types of folds (i.e., instead of spiral folds). Variations such as these will not result in a departure from the scope of the present disclosure.

Figure 8:
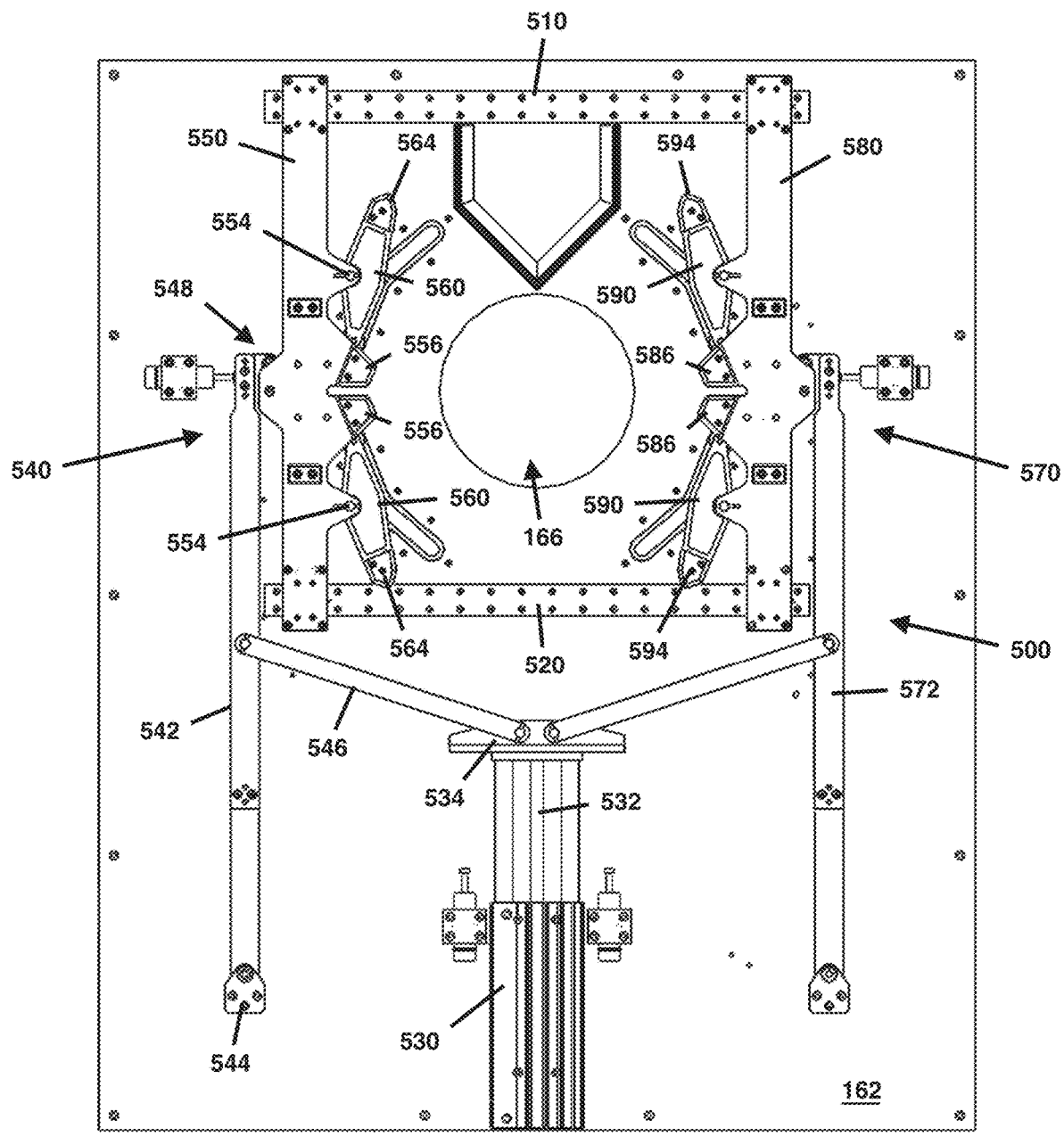
FIG. 8 is a front elevation view of the tooling plate and wrangler mechanism of FIG. 6, showing the wrangler mechanism in its disengaged position.
Figure 9:
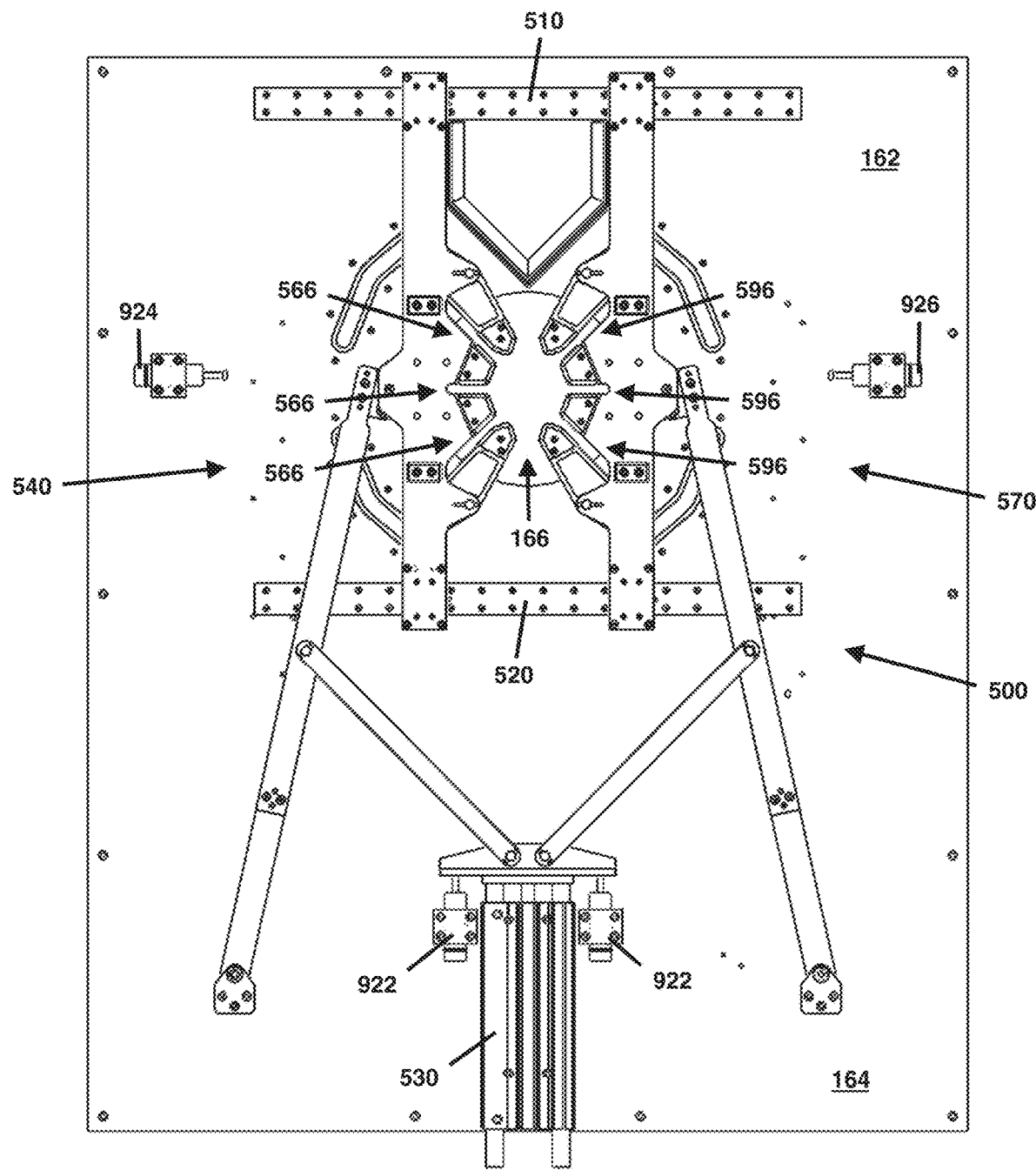
FIG. 9 is a front elevation view of the tooling plate and wrangler mechanism of FIG. 6, showing the wrangler mechanism in its engaged position.

Referring to FIGS. 8 and 9, the system 1000 of FIG. 1 includes wrangler mechanism 500. Wrangler mechanism 500 is configured to close in on the radial periphery of a folded (i.e., twisted) textile and compact it, which retains and tightens the folds. Wrangler mechanism 500 is mounted to the first major side 162 of the tooling plate 160 and includes upper rail 510, lower rail 520, linear actuator 530, first subassembly 540, and second subassembly 570.

Upper rail 510 is mounted above the central opening 166 and lower rail 520 is mounted below the central opening 166. As shown, upper and lower rails 510, 520 may be oriented horizontally, parallel to one another.

Linear actuator 530 is vertically oriented and mounted below the central opening 166. It is configured to extend and retract rod 532 which raises or lowers the attachment head 534 connected to its distal end. Attachment head 534 provides for the attachment of the first and second subassemblies 540, 570 to the linear actuator 530.

The first subassembly 540 includes arm 542, bracket 544, linkage 546, sliding member 550, fingers 560, and contacts 556, 564. Bracket 544 attaches the bottom end of arm 542 to the tooling plate 160 and allows the arm 542 to pivot parallel to the first major side 162. Linkage 546 connects the arm 542 (e.g., at approximately mid length) to the attachment head 534 of the linear actuator 530. The top end of arm 542 is attached to sliding member 550 (e.g., by way of elongated slot 548). Sliding member 550 includes an elongated vertically oriented body with roller brackets 552 attached to its top end and bottom end (along its inward facing side). The roller brackets 552 secure the sliding member 550 to the upper and lower rails 510, 520 and enables the sliding member 550 to slide horizontally along them. Fingers 560 are located in-between the sliding member 550 and the tooling plate 160. Each finger 560 has an elongated body that defines opposing ends and a center section in-between them. The center sections of the fingers 560 can be attached to sliding member 550 by way of pins 554 (along the outward-facing side of the fingers 560) and allowed to freely rotate. Each finger 560 also includes a roller bearing 562 attached to one of the opposing ends (along the inward-facing side of the finger 560) that is fitted into a track 170 defined in the tooling plate 160 (FIG. 10). The orientation and angled shape of tracks 170 causes the fingers 560 to rotate about pins 554 when the sliding member 550 is sliding along the rails 510, 520. Notably, the sliding member 550 also includes a pair of contacts 556 that are either defined by or attached to the sliding member body. These contacts 556 extend towards the central opening 166 and are meant to engage (i.e., contact) a textile. Each finger 560 also includes a contact 564 either defined by or attached to their open (i.e., non-roller bearing) end.

The second subassembly 570 is an identical but mirrored version of the first subassembly 540, with all the same components, configurations, and connections (albeit mirrored).

Figure 22:
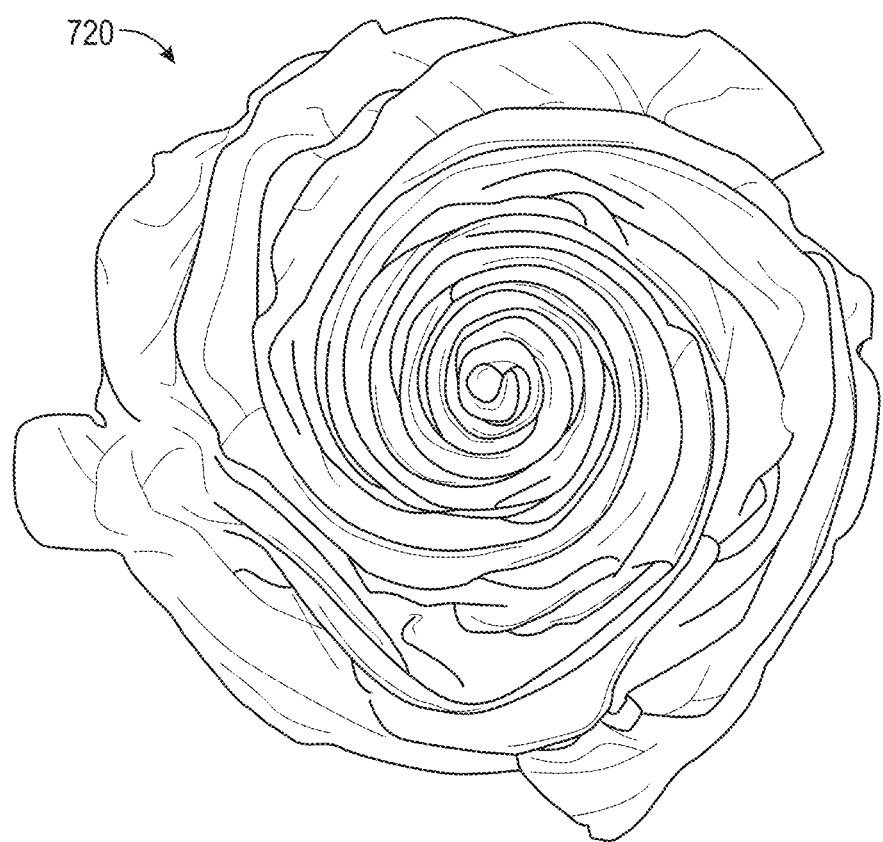
FIG. 22 is a top view of a textile disc created by the system of FIG. 1.
Figure 23:
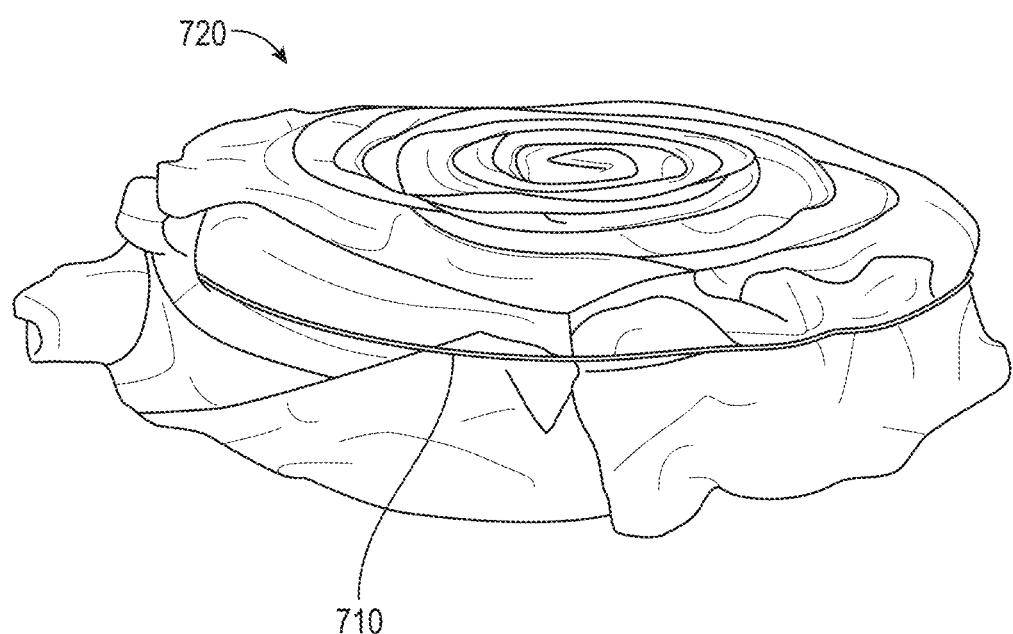
FIG. 23 is a side view of the textile disc of FIG. 22.

By comparing FIGS. 8 and 9, it shown that when the linear actuator 530 is retracted, this movement translates into a pulling force that causes the arms 542, 572 of the first and second subassemblies 540, 570 to pivot towards the central opening 166. This, in turn, simultaneously causes: (1) the sliding members 550, 580 to slide along the rails 510, 520 towards the central opening 166; and (2) the open (i.e., non-roller bearing) ends of the fingers 560, 590 to rotate towards the central opening 166. Thus, the cumulative effect of the linear actuator 530 being retracted is the contacts 556, 564, 586, 594 of the first and second subassemblies 540, 570 being brought towards the central opening 166 from several radial directions, which, in practice, can be used to close in on a textile via an encompassing grip (as opposed to a friction/parallel grip). This causes the textile to be compacted while being sandwiched in-between the center guard 220 and the tooling plate 160, which results in a disc shape (FIGS. 22 and 23). This operation can then be reversed to release the textile and reset the first and second subassemblies 540, 570.

Overall, the components of the first and second subassemblies 540, 570 are movable between a disengaged position (FIG. 8) and an engaged position (FIG. 9). In the disengaged position, the linear actuator 530 is at least partially extended and the first and second subassemblies 540, 570 are retracted relative to the central opening 166. In the engaged position, the linear actuator 530 is at least partially retracted and the first and second subassemblies 540, 570 are closed over the central opening 166.

Referring to FIG. 9, when the first subassembly 540 is in the engaged position there are a number of slots 566 defined between each of its contacts 556, 564—a single slot defined between the two contacts 556 on sliding member 550, and two slots defined between those contacts 556 and the contacts 564 on fingers 560. The same is true for the contacts of the second subassembly 570 (e.g., slots 596). All of these slots 566, 596 are radially oriented relative to the same center point and may be used to facilitate the transfer of textiles away from the tooling plate 160.

Following the loading, folding, and compacting of a textile, door 356 may be removed from central opening 166 to reveal the textile along the second major side 164 of the tooling plate 160. From there, the textile can be unloaded from the wrangler mechanism 500 for subsequent processing.

Figure 17:
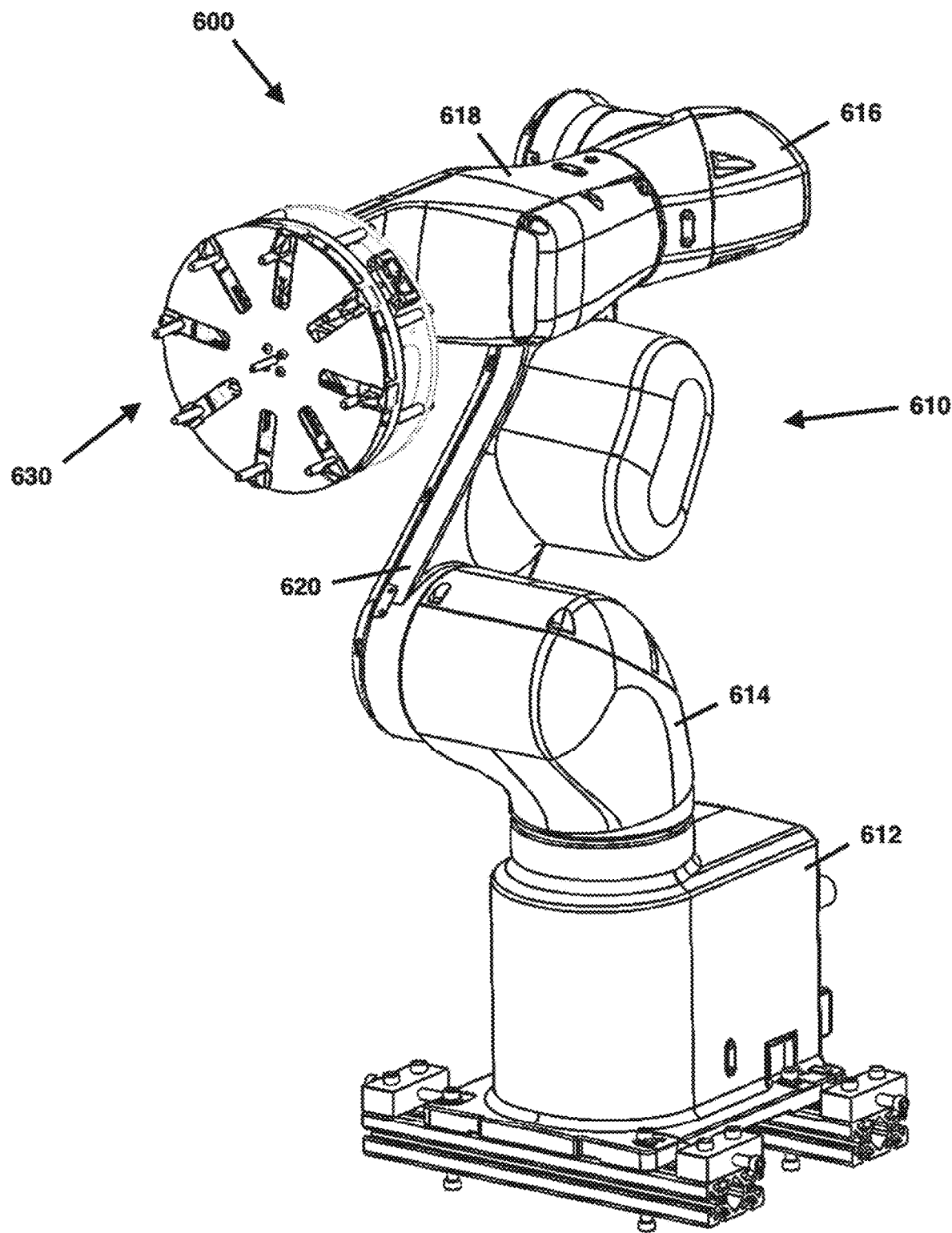
FIG. 17 is a front perspective view of the transfer mechanism of the system of FIG. 1.
Figure 18:
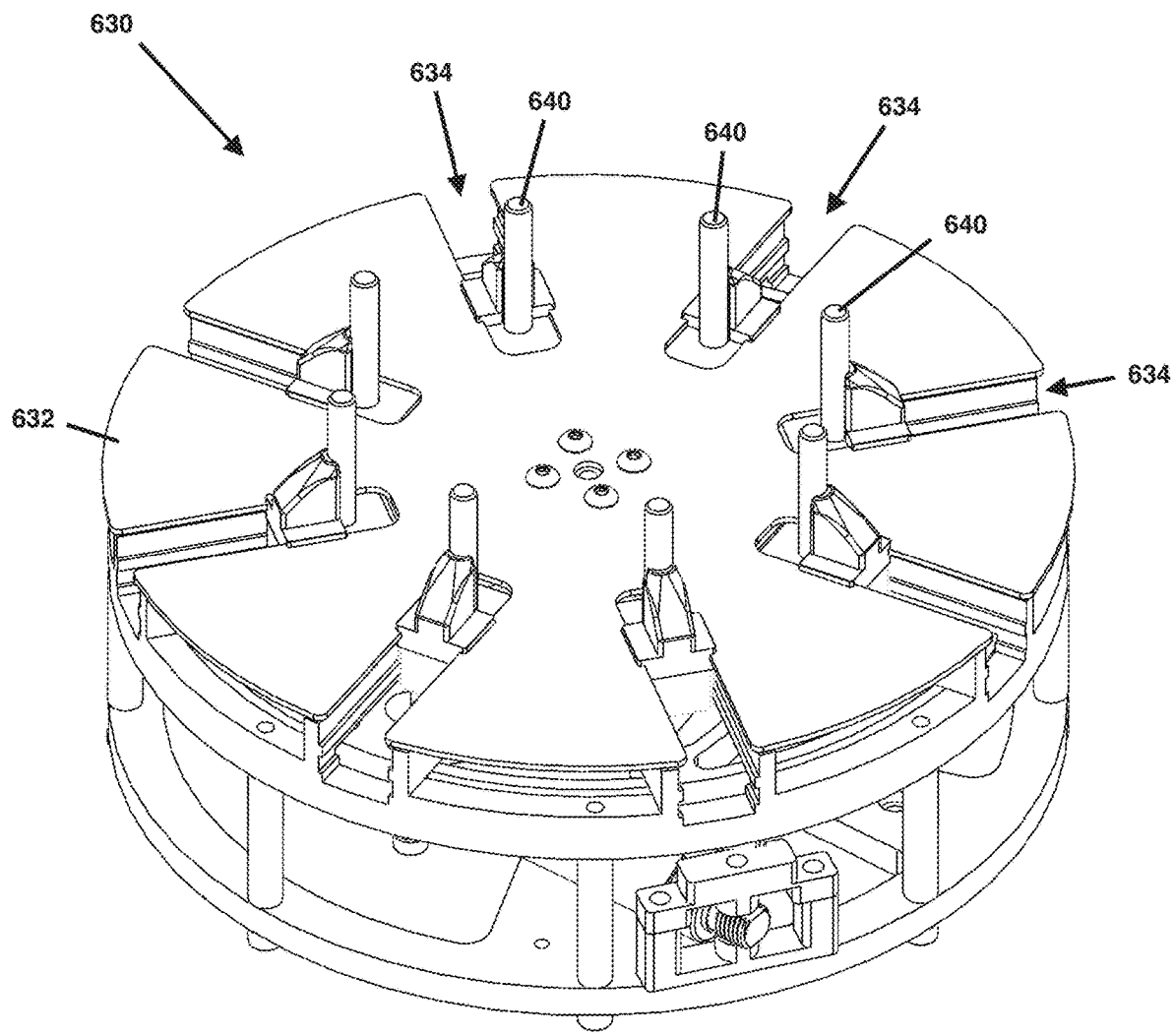
FIG. 18 is a front perspective view of the end-of-arm tooling of the transfer mechanism of FIG. 17, showing the follower prongs thereof in their engaged position and the faceplate thereof in its retracted position.

Referring to FIG. 17, the system 1000 of FIG. 1 includes transfer mechanism 600 for unloading compacted textiles and transferring them elsewhere as needed. Transfer mechanism 600 includes robot arm 610 (i.e., serial manipulator) and end-of-arm tooling (EOAT) 630 (i.e., end effector). The EOAT 630 is configured to grab and eject compacted textiles. The robot arm 610 supports the attachment of the EOAT 630 and is configured to maneuver the EOAT 630 to and from various locations and/or system components. Robot arm 610 may be mounted to the frame 110.

Figure 4:
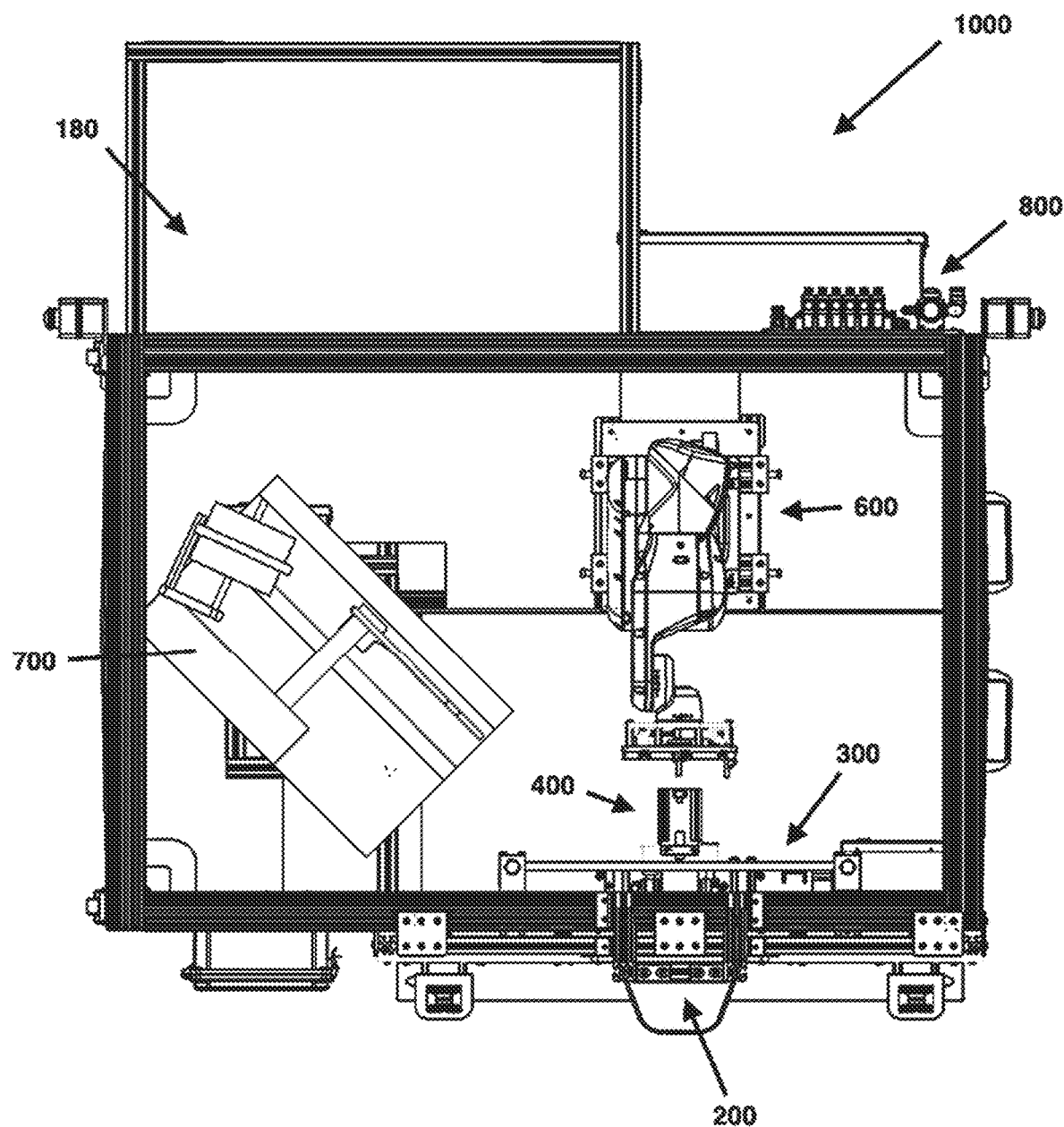
FIG. 4 is a top plan view of the system of FIG. 1.
Figure 5:
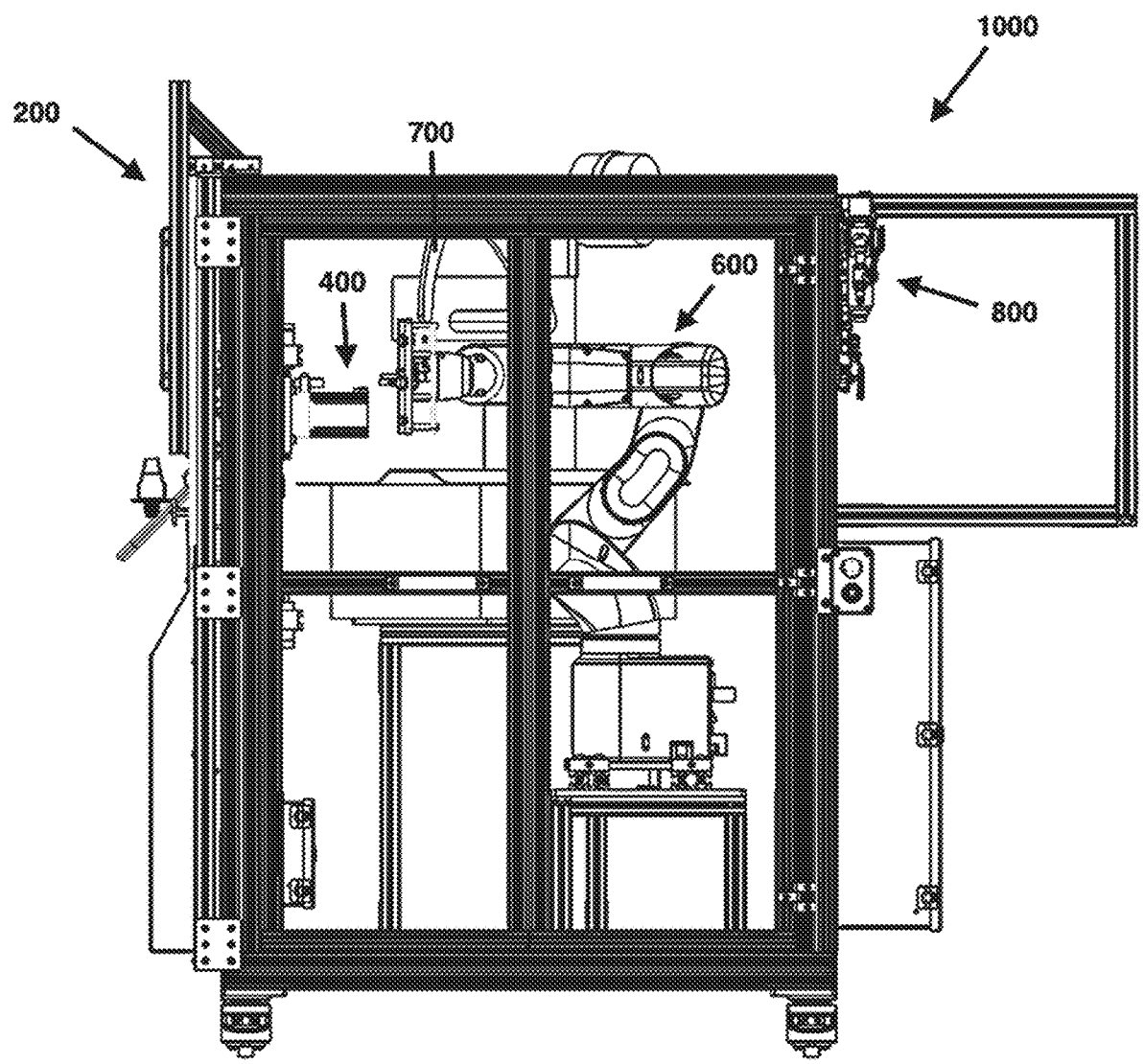
FIG. 5 is a right-side elevation view of the system of FIG. 1.

Referring to FIGS. 4 and 5, it is preferred that robot arm 610 be enclosed within cage 110 to minimize the risk of unintentional worker interference during robot arm 610 operation. It is also preferred that cage 100 be large enough to provide a sufficient range of motion to robot arm 610 such that additional components can be incorporated (e.g., tying machine 700).

An example of a robot arm that may be suitable for use with the present embodiment is the Epson VT6L, which is a 6-axis robot available from Epson Robots Corp. of Carson, California (belonging to their VT Series line of robots). In general, it is contemplated that robot arm 610 does not need to be limited to any particular configuration or arrangement of base (e.g., 612), shoulder (e.g., 614), elbow (e.g., 616), wrist (e.g., 618), and robot link (e.g., 620) components (FIG. 17), nor any related power and control circuitry. Different types of robot arms can be utilized in the system 1000 without departing from the scope of the present disclosure.

Referring to FIGS. 17-20, the EOAT 630 of the present embodiment includes faceplate 632, slot cam 636, and a plurality of follower prongs 640. Faceplate 632 defines a plurality of radial slots 634 oriented towards a common center point. Slot cam 636 is situated beneath the faceplate 632 and defines a plurality of curved slots 638 in a spiral pattern. Follower prongs 640 are circularly arranged and oriented parallel to one another. Each follower prong 640 extends through a radial slot 634 in the faceplate 632 and a curved slot 638 in the slot cam 636. Thus, rotation of the slot cam 636 (e.g., by a rotary actuator, not shown) translates into the simultaneous linear motion of each of the follower prongs 640 either towards or away from the center point of the radial slots 634. In this way, the follower prongs 640 are moveable between at least a disengaged position (FIG. 17) and an engaged position (FIG. 18), which is what enables the gripping function of the EOAT 630. Those skilled in the art will appreciate that the EOAT 630 of the present embodiment is similar to the EOATs utilized for placing O-rings (aka, "O-ring grippers").

Referring to FIGS. 10 and 23, the radial slots 634 defined in the EOAT faceplate 632 (or at least some of them) are configured to align with the slots 566, 596 defined by the fingers 560, 590 and the sliding members 550, 580 of the wrangler mechanism 500 when the fingers 560, 590 and the sliding members 550, 580 are in the engaged position. This ensures that the follower prongs 640 will be able to pass through slots 566, 596 and reach across, at least partially if not entirely, the periphery of a compacted textile when the robot arm 610 inserts the EOAT 530 into the central opening 166. This also ensures that the radial movement of the follower prongs 640 (i.e., the grabbing function) will not be hindered by the sliding members 550, 580 or the fingers 560, 590.

In other embodiments, it is contemplated that different types of EOAT grippers may be utilized rather than the EOAT gripper 630 described above. This can include, for example, Jaw grippers or finger grippers. Variations such as these will not result in a departure from the scope of the present disclosure.

Referring to FIGS. 24 and 25, the EOAT 630 of the present embodiment may further include a linear actuator (not shown) operatively connected to the faceplate 632 that is configured to push and retract faceplate 632 along a linear path parallel to follower prongs 640 when the follower prongs 640 are in their engaged position. This enables the EOAT 630 to eject a textile after gripping it. From there, EOAT 630 can reset the positions of the follower prongs 640 (FIG. 26) and the faceplate 632 in preparation to grab another textile.

Figure 19:
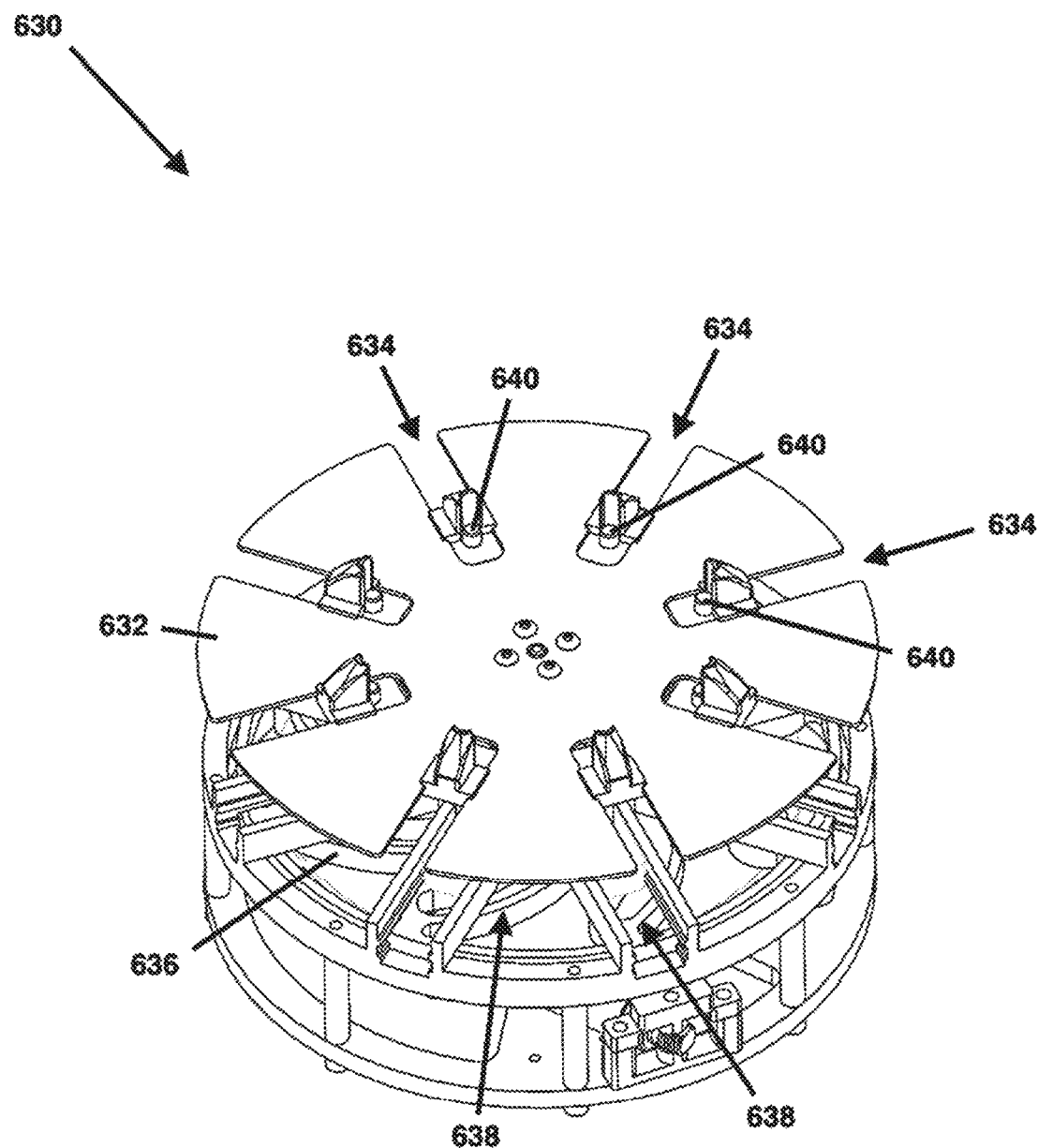
FIG. 19 is a front perspective view of the end-of-arm tooling of the transfer mechanism of FIG. 17, showing the follower prongs thereof in their engaged position and the faceplate thereof in its extended position.
Figure 20:
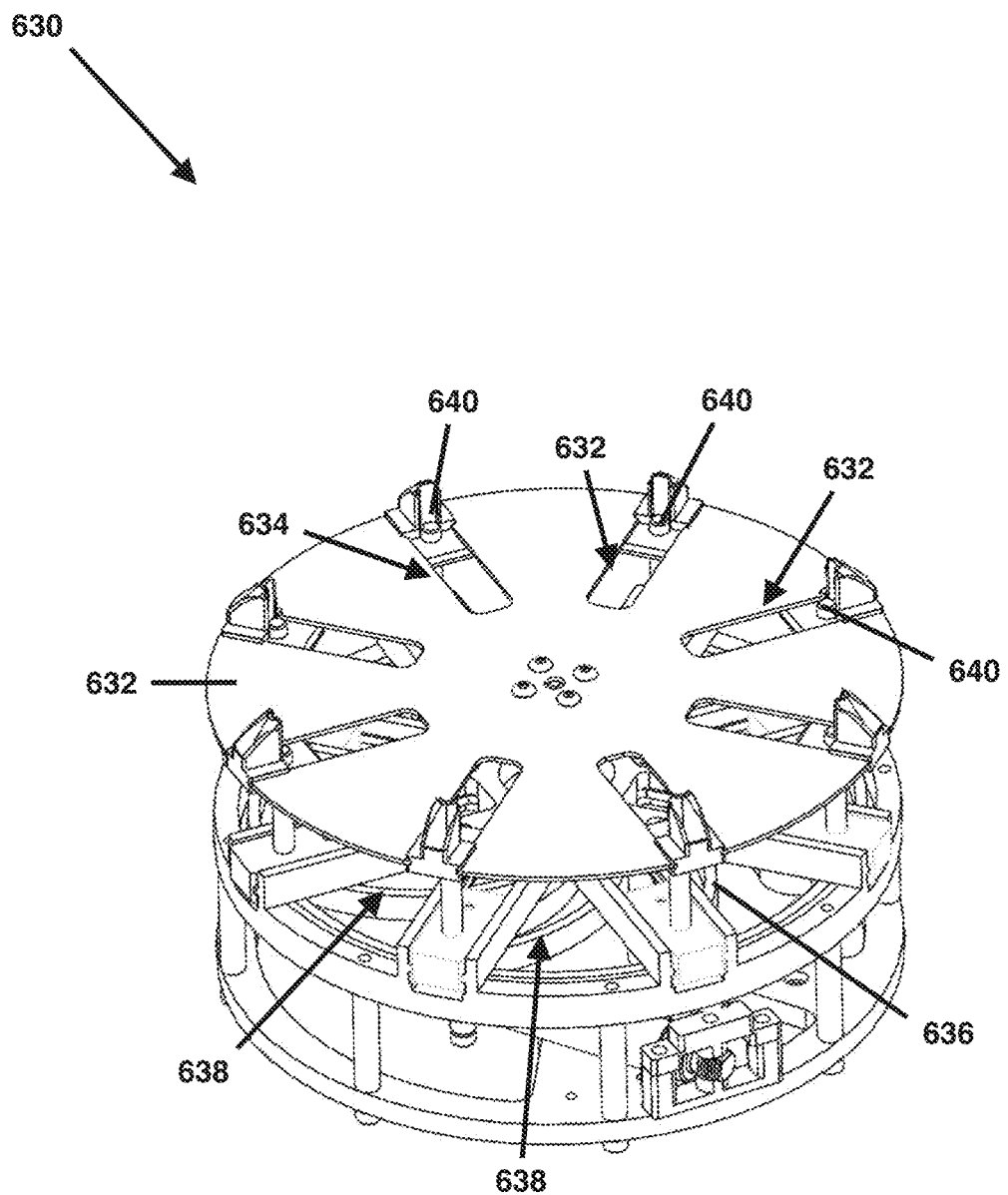
FIG. 20 is a front perspective view of the end-of-arm tooling of the transfer mechanism of FIG. 17, showing the follower prongs thereof in their disengaged position and the faceplate thereof in its extended position.

Referring to FIGS. 4-5, once the EOAT 630 grabs a compacted textile the robotic arm 610 may then transfer the textile out of the wrangler mechanism 500 for subsequent processing. In the embodiment shown, the system 1000 further includes a tying machine 700 positioned within the range of motion of the robotic arm 610. The robotic arm 610 may maneuver a textile through the workspace of the tying machine 700 so that the tying machine 700 can create a binding 710 around the periphery of a compacted textile (e.g., using string, elastic bands, etc.) (FIG. 19). Preferably, the binding 710 may be created over the follower prongs 640 of the EOAT 630 while the EOAT 630 is gripping a textile. Doing so retains the folds created by the fold mechanism 400 and makes the textile easier to maneuver, store, and dye. The resulting folded, compacted, and tied textile is referred to herein as a "textile pack" 720 (FIGS. 22 and 23).

It is contemplated that any suitable tying machine 700 may be utilized with the system 1000. Preferably, tying machine 700 would be a semi-automatic tying machine such as, for example, the Offset Pak-Tyer™ available from Felins USA Inc. of Milwaukee, Wisconsin.

Referring to FIG. 1, after a textile has been tied by the tying machine 700, robot arm 610 can then maneuver the EOAT 630 (with the textile pack 720) to an opening 180 in the cage 100. There, the EOAT 630 may release the textile pack 720 outside of the cage 100 where it can be received and taken for subsequent processing. Preferably, the EOAT 630 would release a textile without displacing or unraveling the binding 710 created by the tying machine 700 (e.g., by pushing it off follower prongs 640 via the EOAT ejecting function described above). Preferably, the system 1000 would further include a conveyor (e.g., conveyor belt) for receiving ejected textile packs and moving them away from the cage 100.

Figure 21:
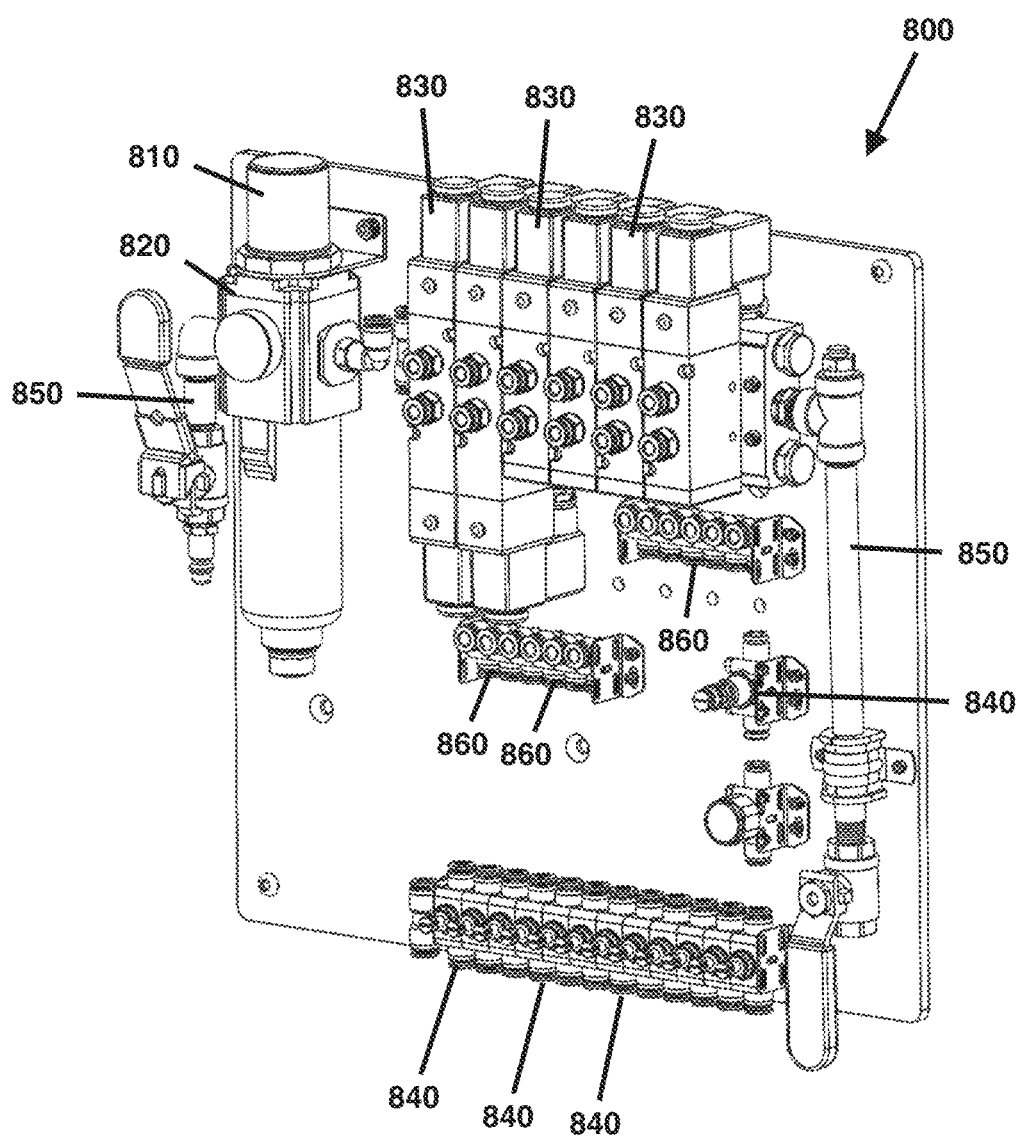
FIG. 21 is a front perspective view of the air control panel of the system of FIG. 1.

Referring to FIG. 21, some, if not all, of the actuators of the system 1000 may be pneumatic, utilizing compressed air to produce mechanical motion. This can include, for example, actuators 340, 352, 410, 530, as well as the linear actuator and the rotary actuator of EOAT 630. To control these pneumatic actuators, air control panel 800 may be provided (shown as being mounted to frame 110) to enable user control over the flowrate and distribution of compressed air. In the embodiment shown, air control panel 800 includes inlet port 810, pressure regulator 820, a plurality of air flow control valves 830 (i.e., valve actuators), adjustable flow meters 840, and outlet lines 850. Inlet port 810 enables the air control panel 800 to be coupled to a compressed air source (e.g., tanks, cannisters, air compressors, and the like) and intake compressed air. Pressure regulator 820 regulates the pressure of the incoming compressed air before it is directed to air flow control valves 830. Air flow control valves 830 enable line connections (e.g., tubing/hosing) for transferring compressed air and/or exhaust to and from the various actuators of the system 1000. Air flow control valves 830 also enable user control over the flow of compressed air and/or exhaust, including whether to start or stop it. Adjustable flow meters 840 may be incorporated into the air tubing/hosing to enable control over (i.e., the adjustment of) the flow rate of compressed air going to the actuators and/or the flow rate of exhaust coming from the actuators (i.e., overall performance tuning). Fittings of any variety (e.g., elbow hose fittings 860) may be provided as needed to orient and/or organize the air hosing/tubing. Outlet lines 850 are provided to release compressed air and/or exhaust as needed.

Either individually or collectively, air flow control valves 830 (and related tubing/hosing) can be configured for single-acting or double-acting control. Single-acting control refers to the ability of an air flow control valve to create a single action with compressed air, such as either extending or retracting a linear actuator. In contrast, double-acting control refers to the ability of an air flow control valve to create two actions with compressed air, such as both extending and retracting a linear actuator. The single and/or double actions can be initiated by toggling an appropriate ON control provided on an air flow control valve 830 (or a directional control if a double-acting air flow control valve is used) and stopped by togging an appropriate OFF control. Preferably, the air flow control valves 830 would also be provided with a neutral control that, when toggled, quickly releases exhaust and allows internal pressure to equalize within an actuator. The neutral control can be incorporated either in or as the OFF control, or may be provided as a separate valve element. It is contemplated that incorporation of a neutral control in the air flow control valves 830 may be important for worker safety since toggling it would allow a worker to manually move (i.e., by hand) an actuator-powered piece of equipment (e.g., wrangler mechanism 500) that would otherwise be urged towards one action or another (e.g., the disengaged position shown in FIG. 8 or the engaged position shown in FIG. 9) by compressed air. Thus, if a worker gets caught (i.e., snagged or snared) in an actuator-powered moving part of the system 1000, the worker can toggle the neutral control on an air flow control valve 830 to release exhaust, lower internal pressure within the actuator, and slowly urge the moving part aside to release him or herself.

It is contemplated that there may be several types of pneumatic valves that would be suitable for use in the system as air flow control valves 830. Pneumatic spool valves, for example, may be appropriate. Specific examples of pneumatic valves that may be suitable include the VS-533E2-24D (which is a 4-way, 3-position, center exhaust double solenoid valve) and the AVS-5312-24D (which is a 4-way, 2-position, single solenoid spring return valve) both available from Automation Direct of Cumming, Georgia.

In other embodiments, it is contemplated that different types of actuators may be utilized either in addition to or as an alternative for the pneumatic actuators described above. This can include, for example, electronic, manual, and hydraulic actuators. Variations such as these will not result in a departure from the scope of the present disclosure.

Control of any given component of the system 1000 may be achieved either on an individual basis (i.e., with dedicated controls for each component) or collectively by way of one or more control units. A "control unit," as used herein, refers to any suitable configuration of electronic components (e.g., processors, memory storage, wired/wireless communications modules, user interface devices such as electronic displays, keyboards, touchscreens, etc.) that is operatively connected to one or more system components (either by wire or wirelessly) and enables control of those system components.

Referring to FIG. 17, the system of FIG. 1 includes control unit 900. Control unit 900 is mounted to the frame 110 and includes a display screen 910 for displaying information about the system 1000 (e.g., idle or active status, system run time, operation progress, number of textiles folded, etc.). Preferably, display screen 910 would be touch-sensitive and configured to receive user input regarding, for example, control or operation of the system components.

Preferably, control unit 900 would be operatively connected to fold mechanism 400 (namely, motor 430 and linear actuators 410), wrangler mechanism 500 (namely, linear actuator 530), door mechanism 300 (namely, linear actuators 340 and 350), transfer mechanism 600 (namely, robot arm 610 and the actuators of EOAT 630), and tying machine 700, and/or to the air flow control valves 830 that supply compressed air to the actuators in these system components. By this configuration, control unit 900 may enable user control (i.e., the ability to activate or deactivate) over each of these system components.

Preferably, control unit 900 would be provided with program instructions that, when executed, initiates an automation script (i.e., a predetermined sequence of operation) involving one or more system components. It is contemplated that such program instructions can improve efficiency (as compared to human operation) by reducing the amount of downtime between sequential steps and by reducing human error. For example, a script may include one or more of the following: (1) activation of the fold mechanism 400 (causing the contact 434 to extend through the opening 360 in door 356 and begin spinning); (2) activation of the wrangler mechanism 500 (causing the components thereof to move into their engaged positions); (3) activation of the door mechanism 300 (causing door 356 to be removed from the central opening 166 and linear actuator 340 to lower the first crossmember 330); (4) activation of the transfer mechanism 600 (causing robot arm 610 to insert the EOAT 630 into the central opening 166, the EOAT 630 to initiate a gripping action, the robot arm 610 to then move the EOAT 630 along a predetermined path to a predetermined location, and the EOAT 630 to initiate an ejection function). A following sequence may involve resetting the positions of the components of the fold mechanism 400, compacting mechanism 500, door mechanism 300, and transfer mechanism 600.

The system 1000 may include a plurality of position sensors incorporated into or attached to various system components and operatively connected to a control unit 900. These position sensors can be utilized as a way of detecting the progress, state, or condition of the system components. It is contemplated that the information gathered by these position sensors may be useful to a user when determining when to active a system component; or may be utilized by a control unit 900 when executing an automation script.

Referring to FIGS. 9 and 10, the system of FIG. 1 includes four position sensors on the first major side 162 of the tooling plate 160—two position sensors 922 located next to linear actuator 530, below attachment head 534; a position sensor 924 located next to the top end of the arm 542 of the first subassembly 540; and a position sensor 926 located next to the top end of the arm 572 of the second subassembly 570. When linear actuator 530 extends rod 532, the arms 542, 572 of the first and second subassemblies 540, 570 will swing outwards (i.e., away from the central opening 166) until they engage position sensors 924, 926. This indicates that the wrangler mechanism 500 is in the disengaged position. When linear actuator 530 retracts rod 532, attachment head 534 will lower until it engages position sensors 922. This indicates that the wrangler mechanism 500 is in the engaged position.

Referring to FIGS. 12 and 16, the system of FIG. 1 also includes six position sensors on the door mechanism 300—a position sensor 932 on each of the endpieces 316, 326 of the first and second vertical members 310, 320 and two more position sensors 934 on the second crossmember 354. Position sensors 932 are each oriented toward the track 314, 316 of their respective vertical members. These position sensors 932 may be engaged by first crossmember 330 when it is either raised or lowered, and therefore may be used to determine the vertical position of the first crossmember 330. Position sensors 934 are oriented towards the tooling plate 160. These position sensors 934 may be engaged by the second major side 164 of the tooling plate 160 when linear actuators 352 are activated, and therefore may be used to determine whether door is inserted into the central opening.

The system of FIG. 1 further includes one position sensor 936 located on top of mounting block 420 of the fold mechanism. Position sensor 936 is oriented towards the outwards-facing side of the first crossmember and may be engaged by the first crossmember when linear actuators 352 are activated. Therefore, position sensor 936 may be used to determine whether the contact 434 is extended or retracted.

As those skilled in the art will appreciate, knowing what position the wrangler mechanism 500 is in, knowing the vertical position of the first crossmember 330, knowing whether the door 356 is inserted into the central opening 166, knowing whether the contact 434 is extended or retracted, and information like this can be useful when sequencing the operation of the system components. For example, linear actuators 352 should not be activated unless the first crossmember 330 is in the raised position because door 356 wouldn't be aligned with the central opening 166; contact 434 should not be extended unless door 356 is in the central opening 166 because it wouldn't be able to contact a textile; and transfer mechanism 600 should not maneuver the EOAT 630 into the central opening 166 unless the first crossmember 300 is lowered because the first crossmember 330 might block the EOAT 630. It is contemplated that logic programming embodying these kinds of considerations may be incorporated into the program instructions for an automation script.

The position sensors 922, 924, 926, 932, 934, 936 of the system 1000 of FIG. 1 are all contact position sensors that are configured to detect position based physical contact (e.g., with first crossmember 300, arm 543, or attachment head 534). In other embodiments, however, it is contemplated that different types of position sensors may be used, such as optical position sensors, ultrasonic position sensors, capacitive position sensors, inductive position sensors, potentiometric position sensors, and the like. Variations such as these will not result in a departure from the scope of the present disclosure.

Referring to FIG. 1, the system 1000 includes a pair of dedicated buttons 940 (e.g., push-activated or touch-sensitive buttons) operatively connected to control unit 900 that, when actuated, will cause the system 1000 to initiate an automation script (e.g., such as the one described above). Preferably, system 1000 may be configured to not operate unless both of these buttons 940 are simultaneously actuated (or close to simultaneously), thereby necessitating that a user of the system 1000 use both hands to initiate an automation script. And, by spacing these buttons 940 approximately a human wingspan apart, this configuration reduces the likelihood that a user's extremities (e.g., fingers) will accidently get caught in the moving parts of the system 1000 (namely, wrangler mechanism 500).

Referring to FIGS. 22 and 23, it is shown that the textile packs 720 created by the system 1000 are generally uniform in size, shape, and fold distribution. Due to this, it is contemplated that tie-dye textiles (e.g., t-shirts) made using these textile packs 720 may feature a more consistent patterning than would otherwise be possible if they were made by hand.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for creating folds in textiles, the system comprising:
  a first planar surface;
  a second planar surface spaced apart from the first planar surface;
  a loading space defined in-between the first planar surface and the second planar surface where textiles can be inserted;
  an opening defined in the first planar surface;
  a fold mechanism comprising:
    a fold mechanism contact;
    a means for inserting the fold mechanism contact through the opening to engage a textile against the second planar surface;
    a motor configured to rotate the fold mechanism contact, thereby twisting the textile;
  a wrangler mechanism comprising:
    a plurality of wrangler mechanism contacts located within the loading space that are arranged about the opening;
    a means for moving each wrangler mechanism contact between at least a first position and a second position, wherein:
      the first positions of each wrangler mechanism contact is closer to the opening than the second positions of each wrangler mechanism contact;
      the wrangler mechanism contacts, when in the first position, are configured to compact a textile that has been inserted into the loading space.

2. The system of claim 1, wherein:
  the fold mechanism further comprises a fixed-length shaft that defines opposing ends;
  one of the opposing ends is operatively connected to the motor;
  the fold mechanism contact is located on the other opposing end;
  the means for inserting the fold mechanism contact comprises a linear actuator configured to move the motor, shaft, and fold mechanism contact along a linear path through the opening until the fold mechanism contact is brought proximate the planar surface.

3. The system of claim 1, wherein the fold mechanism contact is paddle-shaped.

4. The system of claim 1, wherein the first positions of the wrangler mechanism contacts are configured to compact a textile via an encompassing grip.

5. The system of claim 1, wherein the means for moving is configured to simultaneously move each wrangler mechanism contact between their first and second positions.

6. The system of claim 1, wherein:
the means for moving comprises a first sliding member and a second sliding member, both located within the loading space;
the first and second sliding members are spaced apart from one another, with the opening being located in-between them;
at least one wrangler mechanism contact of the plurality of wrangler mechanism contacts is located on the first sliding member, extending towards the opening;
at least one wrangler mechanism contact of the plurality of wrangler mechanism contacts is located on the second sliding member, extending towards the opening; and
the first and second sliding members are moveable between at least a first position and a second position; and
the first positions of the first and second sliding members is closer to the opening than the second positions of first and second sliding members.

7. The system of claim 6, wherein:
the means for moving further comprises a rail mounted onto either the first planar surface or the second planar surface; and
the first sliding member comprises a roller bracket that secures the first sliding member to the rail and enables the first sliding member to travel along it.

8. The system of claim 6, wherein:
the means for moving further comprises an elongated finger that defines opposing ends;
a wrangler mechanism contact of the plurality of wrangler mechanism contacts is located on one of the opposing ends;
the finger is rotatably attached to the first sliding member and moveable between at least a first angular position and a second angular position;
the wrangler mechanism contact is closer to the opening when the finger is in its first angular position than when the finger is in its second angular position; and
the finger is configured to simultaneously rotate towards its first angular position when the sliding member is moved towards its first position.

9. The system of claim 6, wherein the means for moving further comprises an actuator connected to the first sliding member that is configured to move the first sliding member between its first and second positions.

10. A system for creating folds in textiles, the system comprising:
a vertical tooling plate that defines a first major side, a second major side opposite the first major side, and an opening through the tooling plate that extends between the first major side and the second major side;
a planar surface spaced apart from the first major side of the tooling plate;
a loading space where textiles can be inserted into the system, the loading space being defined in-between the planar surface and the first major side of the tooling plate;
a door mechanism comprising:
a door sized and shaped to fit within the opening in the tooling plate;
a means for inserting the door into, and removing the door from, the opening in the tooling plate;
an opening defined in and extending through the door;
a fold mechanism comprising:
a fold mechanism contact;
a means for inserting the fold mechanism contact through the opening in the door to engage a textile against the planar surface; and
a motor configured to rotate the fold mechanism contact, thereby twisting the textile;
a wrangler mechanism comprising:
a plurality of wrangler mechanism contacts located within the loading space and arranged about the opening in the door;
a means for moving each wrangler mechanism contact between at least a first position and a second position, wherein
the first positions of each wrangler mechanism contact is closer to the opening in the door than the second positions of each wrangler mechanism contact;
the wrangler mechanism contacts, when in the first position, are configured to compact a textile that has been inserted into the loading space.

11. The system of claim 10, wherein the means for inserting and removing the door comprises a linear actuator configured to move the door along a horizontal path leading into and out of the opening in the tooling plate.

12. The system of claim 11, wherein:
the means for inserting and removing the door further comprises:
an elongated vertical member;
a vertical track extending along the length of the vertical member;
an elongated horizontal member;
a roller bracket attached to the horizontal member that secures the horizontal member to the track and enables the horizontal member to travel along it;
a linear actuator configured to move the horizontal member along the track, thereby raising or lowering it;
the linear actuator that is configured to move the door is mounted to the horizontal member.

13. The system of claim 12, wherein the fold mechanism is mounted to the horizontal member.

14. A system for creating folds in textiles, the system comprising:
a tooling plate that defines a first major side, a second major side opposite the first major side, and an opening through the tooling plate that extends between the first major side and the second major side;
a planar surface spaced apart from the first major side of the tooling plate;
a loading space where textiles can be inserted into the system, the loading space being defined in-between the planar surface and the first major side of the tooling plate;
a door mechanism proximate the second major side of the tooling plate comprising:
a door sized and shaped to fit within the opening in the tooling plate;
a means for inserting the door into, and removing the door from, the central opening;
an opening defined in and extending through the door;
a fold mechanism proximate the second major side of the tooling plate comprising:
a fold mechanism contact;

a means for inserting the fold mechanism contact through the opening in the door to engage a textile against the planar surface; and a motor configured to rotate the fold mechanism contact, thereby twisting the textile;

a wrangler mechanism proximate the first major side of the tooling plate comprising:

a plurality of wrangler mechanism contacts located within the loading space and arranged about the opening in the door;

a means for moving each wrangler mechanism contact between at least a first position and a second position, wherein the first positions of each wrangler mechanism contact is closer to the opening in the door than the second positions of each wrangler mechanism contact;

the wrangler mechanism contacts, when in the first position, are configured to compact a textile that has been inserted into the loading space.

15. The system of claim 14 further comprising a loading assembly proximate the first major side of the tooling plate, the loading assembly comprising:

a guard that defines the planar surface; and at least one brush mounted to the first major side of the tooling plate.

16. The system of claim 14 further comprising a transfer mechanism proximate the second major side of the tooling plate, the transfer mechanism comprising a robot arm and an end-of-arm-tooling (EOAT) attached to the robot arm, wherein:

the robot arm is configured to maneuver the EOAT through the opening in the tooling plate from the second major side;

the EOAT is configured to grip a textile that was inserted into the loading space; and the robot arm is configured to transfer a textile out of the loading space by maneuvering the EOAT, while gripping the textile, out of the opening in the tooling plate.

17. The system of claim 16, wherein:

the EOAT comprises a faceplate, a slot cam, and a plurality of follower prongs;

the faceplate defines a plurality of radial slots oriented towards a common center point;

the slot cam defines a plurality of curved slots oriented in a spiral pattern;

each follower prong extends through a radial slot in the faceplate and a curved slot in the slot cam; and rotation of the slot cam causes the follower prongs to move between a first position and a second position; and the follower prongs are closer to the common center point of the radial slots when they are in their first positions than in their second positions.

18. The system of claim 17, wherein:

two wrangler mechanism contacts of the plurality of wrangler mechanism contacts define a slot in-between them when they are in their first positions; and the orientation of at least one radial slot defined in the faceplate of the EOAT aligns with the slot defined between the two wrangler mechanism contacts when the robot arm maneuvers the EOAT into the opening in the tooling plate.

19. The system of claim 17, wherein the EOAT further comprises a linear actuator configured to extend or retract the faceplate.

20. The system of claim 14 further comprising a tying machine configured to apply a binding to textiles after they have been folded by the folding mechanism and compacted by the wrangler mechanism.

* * * * *